US006727775B2

(12) United States Patent
Basawapatna et al.

(10) Patent No.: US 6,727,775 B2
(45) Date of Patent: Apr. 27, 2004

(54) FERRITE CRYSTAL RESONATOR COUPLING STRUCTURE

(75) Inventors: Varalakshmi Basawapatna, Greenwood Village, CO (US); Ganesh Ramaswamy Basawapatna, Greenwood Village, CO (US)

(73) Assignee: Sirenza Microdevices, Inc., Broomfield, CO (US)

( * ) Notice: Subject to any disclaimer, the term of this patent is extended or adjusted under 35 U.S.C. 154(b) by 141 days.

(21) Appl. No.: 09/997,468

(22) Filed: Nov. 29, 2001

(65) Prior Publication Data

US 2003/0098755 A1 May 29, 2003

(51) Int. Cl.[7] .............................. H04B 1/16; H01P 7/10; H01P 1/215

(52) U.S. Cl. .................... 333/17.1; 333/219; 333/219.2

(58) Field of Search ................................ 333/17.1, 202, 333/209, 219, 219.2

(56) References Cited

U.S. PATENT DOCUMENTS 4,127,819 A * 11/1978 Keane ..................... 455/192.1
4,480,238 A * 10/1984 Iwasaki ...................... 333/202
4,888,569 A * 12/1989 Nicholson et al. .......... 333/209
5,028,886 A * 7/1991 Seibel et al. .................... 331/4
5,298,872 A 3/1994 Trump et al. ............... 333/202
5,428,324 A 6/1995 Andersson et al. ......... 333/202
5,793,268 A 8/1998 Ataiiyan et al. ............ 333/219
5,801,591 A 9/1998 Parrott ........................ 331/96
5,959,513 A * 9/1999 Parrott et al. ............ 333/219.2

* cited by examiner

*Primary Examiner*—Robert Pascal
*Assistant Examiner*—Dean Takaoka
(74) *Attorney, Agent, or Firm*—Christopher P. Maiorana, P.C.

(57) ABSTRACT

Single and multiple ferrite crystal resonator, oscillator, and filter coupling structures are disclosed. In one embodiment, a single ferrite crystal resonator coupling structure is configured as a single pole YIG-tuned-oscillator (YTO) coupling structure. The YTO coupling structure includes a circuit substrate having an upper and a lower side. The circuit substrate includes an aperture extending through the circuit substrate between first and second openings on the upper and lower sides, respectively. The aperture is configured to permit rotation of a ferrite crystal disposable at least partially therein about a plurality of axes whereby a desirable axis of the ferrite crystal is alignable with a magnetic field within the aperture. At least one coupling line through which an electric current can be directed, which extends between a first end and a second end of the first opening of the aperture across at least a portion of the first opening of the aperture. The coupling line or lines may be etched on the lower surface of a coupling substrate positioned over the aperture. A bipolar transistor is mounted on the circuit substrate with an emitter terminal thereof electrically connected to the first end of the coupling line or lines.

20 Claims, 15 Drawing Sheets

*FIG. 4*
*(PRIOR ART)*
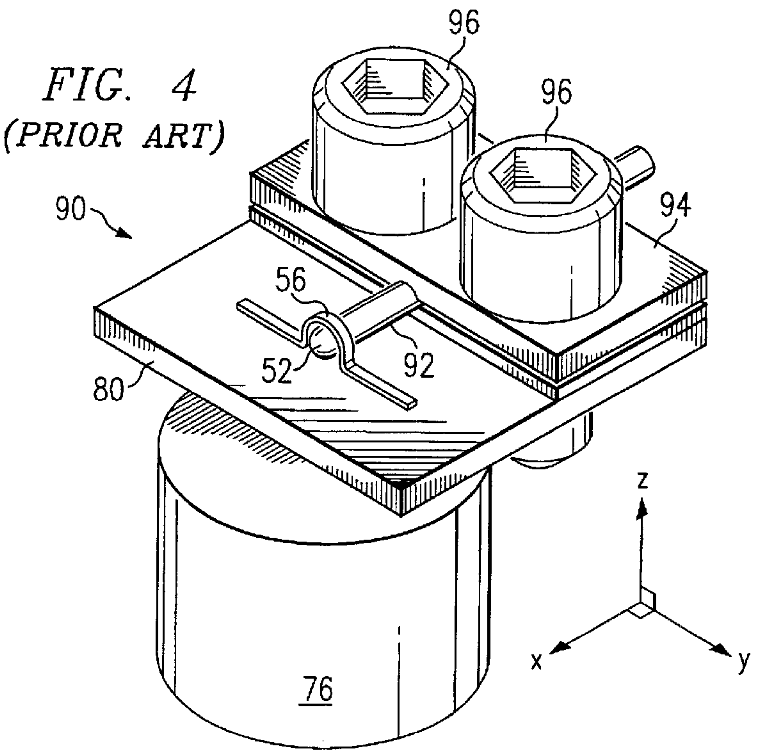
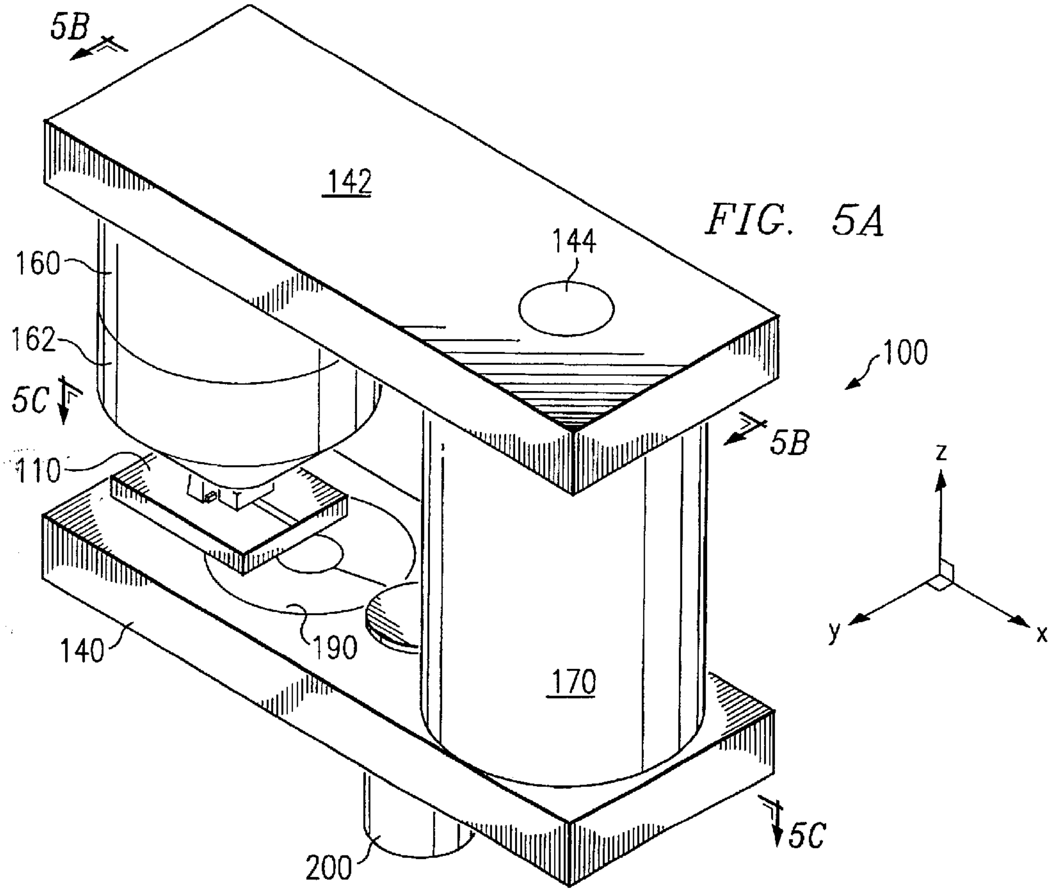
*FIG. 5A*

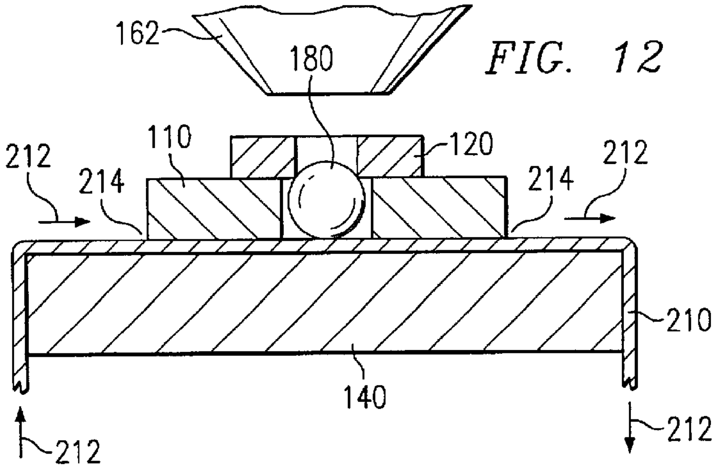
FIG. 12
FIG. 14A
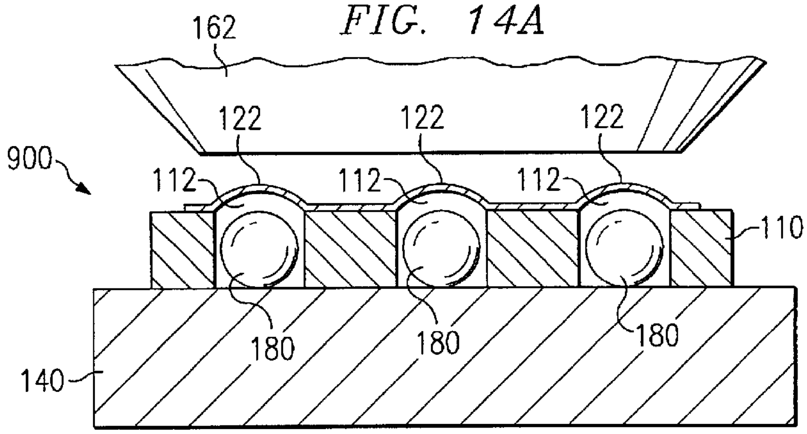
FIG. 14B
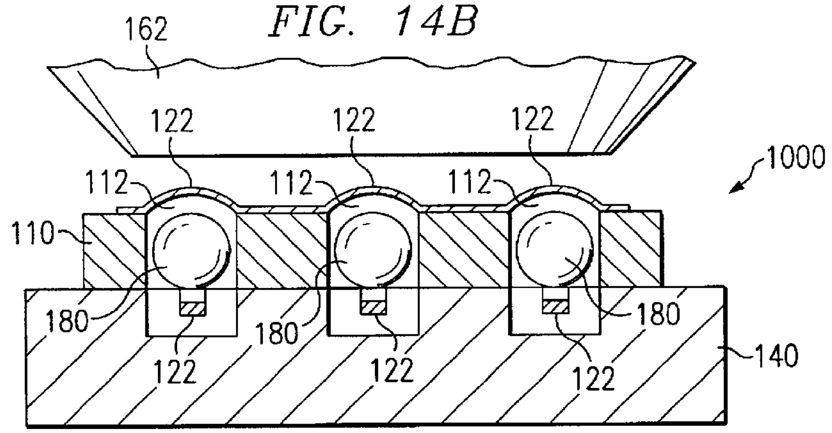

FERRITE CRYSTAL RESONATOR COUPLING STRUCTURE

FIELD OF THE INVENTION

The present invention relates to high frequency resonators, and more particularly to ferrite crystal resonators useful in high frequency oscillator, filter and other applications.

BACKGROUND OF THE INVENTION

Ferrite materials such as pure or doped yttrium-iron-garnet (YIG) have been used as resonating elements, typically in the form of a spherical crystal or thin layer, to construct high frequency capable resonators. In addition to YIG, other ferromagnetic material such as, for example, NiZn, MgMn, LiZn, may be used as resonating elements. Ferrite resonators have several applications, including high frequency filters and local oscillators for use in high frequency transceiver systems, such as those that operate in the microwave and millimeter wave frequency bands from approximately 1 GHz to 40 GHz.

The increase in the number of applications for Ku and Ka band transceivers has created a need for up-converter and down-converter designs that are capable of addressing multiple frequency ranges of 1 GHz bandwidth or more over the 1 GHz to 40 GHz frequency ranges. The market for these devices depends upon a combination of low cost and high performance, and the ability to address multiple frequency ranges with the same design.

There are several modes in which such high frequency transceiver systems are designed to operate, including the Frequency Division Multiple Access (FDMA) mode and the Time Domain Duplex (TDD) mode. In the FDMA mode, the transceiver both receives and transmits data simultaneously on separate receive and transmit frequencies. In the TDD mode, the transceiver operates at a single frequency at a time and either transmits or receives but not both. Regardless of whether the transceiver is designed to operate in the FDMA mode or TDD mode, the ideal transceiver system is able to have its frequency of operation set remotely and changed at will according to traffic needs. However, until now, such systems have generally been quite expensive or unable to provide the performance levels required.

FIG. 1 shows a block diagram of a typical Ku/Ka band transceiver 10 which operates in the FDMA mode and includes an upconverter/downconverter unit 12. The received signal 14 from the antenna 16 is directed via a diplexer 18 to a low noise amplifier 20. The received signal 14 is down-converted by a receive mixer 22 which mixes the received signal 14 with a down-conversion signal 24 to obtain a received intermediate frequency (IF) signal 26. The received IF signal 26 is amplified by an IF amplifier 28 and transmitted to other equipment for further processing. The down-conversion signal 24 is supplied by a receive local oscillator subsystem 30 through a receive band-pass filter 34 to the receive mixer 22. The down-conversion signal 24 may, for example, be approximately 18 GHz, in which case the receive band-pass filter is an 18 Ghz band-pass filter. On the transmit side, a transmit IF signal 36 is received from other equipment and directed through a transmit IF amplifier 38 to a transmit mixer 40. The transmit mixer 40 up-converts the transmit IF signal 36 by mixing it with an up-conversion signal 42 supplied to the transmit mixer 40 by a transmit local oscillator subsystem 32 through a transmit band-pass filter 44. The up-conversion signal 42 may, for example, be approximately 27 GHz, in which case the transmit band-pass 44 filter is a 27 Ghz band-pass filter. The up-converted transmit signal 46 is amplified by a transmit power amplifier 48 to the appropriate transmit power level and sent to diplexer 18 to be transmitted by the antenna 16. As may be appreciated, the receive and transmit local oscillator subsystems 30, 32 are the heart of the upconverter/downconverter 12 in the transceiver 10 of FIG. 1. The other circuit elements of the transceiver 10 are available from a number of sources and, with the exception of the transmit power amplifier 48, can be made reasonably broadband.

In general, three different types of local oscillators have been used in high frequency transceivers: varactor tuned oscillators (VCOs), dielectric resonator oscillators (DROs), and YIG tuned oscillators (YTOs). In all three cases the desired frequency of operation is achieved by phase locking the signal source to a low noise crystal reference oscillator using a phase lock loop, and in the case of tunable systems by synthesis techniques.

VCO synthesizers typically have poor phase noise qualities and limited tuning bandwidth. These inherent limitations result because most high performance varactors have an effective unloaded quality factor, "Q", of less than 100 at 5 GHz, and less than 50 at 10 GHz. The operational, or "loaded" circuit Q is a fraction of this value. This low Q limits both the phase noise and tuneability, since wider tuning range demands more coupling or lower Q, and results in worse phase noise. As the frequency of operation gets higher this gets worse. Also, varactors have severe thermal drift that must be compensated for in system applications. These factors limit applicability of varactors in high frequency applications such as local multipoint distribution system (LMDS) and satellite data communications, as well as in high data rate applications where phase noise is critical.

DRO's are single frequency devices. Their frequency tuneability is minimal, typically sufficient only for phase locking. Therefore they are used in phase locked oscillators. Dielectric resonators have Q's on the order of 1000 at 10 GHz, but this too declines with frequency. They are used in applications that need low phase noise and low cost, at a sacrifice of tuneability.

YTOs have the advantage of very low phase noise and wideband tuneability. The intrinsic Q of a YIG sphere is typically 1000 at 2 GHz and increases with frequency. YIGs are also magnetically tunable over multiple octaves in the microwave frequency range. However, YTOs are typically much costlier than VCOs or DROs because of the magnetic circuit drivers and magnet design involved, the complexity and associated labor cost of mounting and aligning the YIG sphere in the circuit for proper coupling, and because the coupling structure typically precludes the use of packaged transistors for wideband applications. However, in high data rate frequency agile applications, YTOs are practically the only way to go in spite of the much higher cost of YTO synthesizers.

FIG. 2 shows a schematic diagram of a typical YTO circuit 50. A YIG sphere 52 is positioned within a direct current (DC) magnetic field (represented by arrow $H_{dc}$). The DC magnetic field $H_{dc}$ is applied to the YIG sphere 52 by a magnet having a pole tip 54 positioned proximate to the YIG sphere 52. The YIG sphere 52 is coupled with a coupling line 56 positioned between the magnet pole tip 54 and the YIG sphere 52. An active device 58 capable of amplification or intrinsic or induced negative resistance and having two or more terminals, e.g., a Si bipolar transistor or a GaAs MOSFET, is connected at an input port 58A thereof, e.g., the emitter terminal or the source, drain, or gate terminal, to a first end 56A of the coupling line 56. A second end 56B of the coupling line 56 may be connected to a capacitor 60. An appropriate feedback element or feedback circuitry 62 may be connected to a feedback port 58B, e.g., the base terminal or the source, drain or gate terminal, of the active device 58 so that the resonance provided by the YIG sphere 52 creates a negative resistance at an output port 58C, e.g., the collector terminal or the source, drain or gate terminal, of the active device 58. The quality factor Q of this negative resistance and the inherent 1/f noise characteristics of the YTO circuit 50 determine the phase noise of the output oscillations. If required, an output matching circuit 64 may be connected to the output port 58C of the active device 58.

The applied DC magnetic field $H_{dc}$ sets up resonance in the YIG sphere 52 in accordance with a relation given, to a first order, by equation (1):

$$F_{res}=2.8\times H_{dC} \quad (1)$$

where $F_{res}$ is the resonant frequency in MHz and $H_{dc}$ is the intensity of the applied DC magnetic field in Oersteds. Thus, the resonant frequency may be adjusted by adjusting the intensity of the applied DC magnetic field $H_{dc}$. In this regard, a portion of the applied DC magnetic field $H_{dc}$ may be supplied by a permanent magnet and a portion of the applied DC magnetic field $H_{dc}$ may supplied by one or more electromagnetic coils in series with the permanent magnet that is connected to a variable current source. Free electrons in the YIG sphere 52 precess at a resonant frequency. When a radio frequency (RF) magnetic field (represented by arrow $H_{rf}$) at this resonant frequency is applied orthogonally to the DC magnetic field $H_{dc}$ by means of a current through the coupling line 56, the angle of precession of the free electrons changes and energy is coupled into the YIG sphere 52 at the precession frequency resulting in a very rapid change of reactance seen at the output terminal 58C of the active device 58. At any other frequency, the YIG sphere 52 is transparent to the circuit 50.

The typical YTO circuit 50 shown in FIG. 2 is commonly implemented with a YTO coupling structure 70 such as illustrated in the cross-sectional and enlarged cross-sectional views of FIGS. 3A–B. In the YTO coupling structure 70, the YIG sphere 52 is positioned in the pole gap 72 of an electromagnet with electromagnetic pole tip 86. The electromagnet typically includes a permanent magnet 74 combined with a main tuning coil 76 and a fine tuning coil 78, which together with the permanent magnet 74 provide the DC magnetic field $H_{dc}$ (represented by the vertically oriented dashed lines in the pole gap 72).

The main tuning coil 76 provides for coarse tuning of the YTO circuit 50, and the fine tuning coil 78 (or FM coil) provides for the fine tuning that is used to phase lock the YTO circuit 50. An active device 58 is provided on the surface of a substrate 80 and the input port 58A thereof is connected to the coupling line 56 that couples to the YIG sphere 52. The YIG sphere 52, coupling line 56, active device 58, permanent magnet 74, main tuning coil 76, fine tuning coil 78, and substrate 80 are all hermetically sealed within an enclosure 82 having an RF output port 84 for outputting the signal generated by the YTO circuit 50. Current directed through the coupling line 56 creates the RF magnetic field $H_{rf}$ (represented by the circled "x's") orthogonal to the DC magnetic field $H_{dc}$. These field lines, being in air, do not get terminated and couple over large distances causing resonance frequency shifts and other unwanted coupling phenomena. Therefore, it is necessary to build two separate YTO coupling structures 70 in two separate enclosures 72 if one wishes to create two oscillators.

The resonant frequency of the YIG sphere 52 may drift as the temperature of the YIG sphere 52 changes due, for example, to ambient temperature change, the heat generated by currents in coupling line 56, main tuning coil 76 and fine tuning coil 78 or heat from other devices near the YTO coupling structure 70. The amount of temperature dependent drift in the resonant frequency of the YIG sphere 52 depends upon the crystallographic orientation of the YIG sphere 52 with respect to the applied DC magnetic field $H_{dc}$. In fact, every YIG sphere 52 includes a plurality of thermally compensated axes wherein temperature dependent frequency drift of the YIG sphere 52 is minimal, or even non-existent, when one of the thermally compensated axes is aligned with the applied DC magnetic field $H_{dc}$. Thus, to provide the best performance, it is preferred that the YIG sphere 52 be oriented such that a thermally compensated axis of thereof is aligned with the DC magnetic field $H_{dc}$. To achieve these thermally compensated axes, it is necessary to mount the sphere accurately on a dielectric rod and manually rotate it and measure until the proper axis is achieved. These are expensive assembly and test processes.

FIG. 4 shows a conventional YTO coupling structure 90 that permits alignment of the YIG sphere 52 with the applied DC magnetic field $H_{dc}$. In this conventional YTO coupling structure 90, the YIG sphere 52 is attached, preferably by epoxy, to the end of a sphere holding rod 92, which in turn is held by a clamp 94 which is held in place by clamp screws 96 and mounted on the substrate 80. The YIG sphere 52 is positioned under the coupling line 56, which may be a full loop around the YIG sphere or a partial loop such as the half loop as shown in FIG. 4. A single-pole permanent magnet 76 is shown, although a symmetrical two-pole magnet is also possible.

To align the YIG sphere 52, the clamp 94 is loosened by loosening the clamp screws 96 so that the x-axis position of the YIG sphere 52 may be adjusted under the coupling line 56. The sphere holding rod 92 is then rotated to bring a thermally compensated axis in line with the DC magnetic field $H_{dc}$. When this alignment is achieved, the YIG sphere 52 is locked into position by tightening the clamp screws 96 to hold the rod 92 tightly in the clamp 94. Since the sphere is fixed on the rod 92, it is only rotateable about one axis, i.e., the axis of the rod 92, so only a finite number of thermally compensated axes, typically two or four, are available to align with the DC magnetic field $H_{dc}$. If these axes have modes or frequency instabilities as is not unusual in YIG spheres, the YIG sphere 52 must be discarded and a new YIG sphere needs to be tried, resulting in poor YIG sphere 52 yield. Additionally this process needs an operator and requires substantial time to rotate the YIG sphere 52 a few degrees and test it, rotate it further and test again, etc., until a thermally compensated axis is identified.

Accordingly, there exists a need for a ferrite crystal resonator coupling structure which includes a readily movable ferrite crystal sphere, without the need to conduct extensive assembly and test procedures to ensure proper magnetic alignment thereof.

SUMMARY OF THE INVENTION

An object of the present invention is to provide a ferrite crystal resonator coupling structure which incorporates a readily mountable ferrite crystal sphere.

Another object of the present invention is to provide a ferrite crystal resonator coupling structure that permits rotation of a ferrite crystal about a plurality of axes whereby a desired axis of the ferrite crystal can be aligned with a magnetic field and the crystal subsequently fixed in the desired orientation.

A further desired object of the present invention is to provide a ferrite crystal resonator coupling structure that is well suited for use in high frequency oscillator and filter circuits.

Yet another object of the present invention is to provide a multiple ferrite crystal resonator coupling structure suited for use as the downconverter and upconverter local oscillator source in high frequency transceiver applications.

Still a further object of the present invention is to provide a resonator having a desired axis which may be a resultant zero-drift axis for the circuit incorporating the ferrite crystal resonator coupling structure, such that the resultant zero-drift axis may coincide with a thermally compensated axis of the ferrite crystal.

In order to achieve these and other objects of the present invention that will become apparent with respect to the foregoing disclosure, the present invention provides a ferrite crystal resonator coupling structure including a circuit substrate having a first side and a second side opposite the first side. The circuit substrate includes an aperture extending through the circuit substrate from a first opening on the first side of the circuit substrate to a second opening on the second side of the circuit substrate. The aperture is configured to permit rotation of a ferrite crystal disposable at least partially therein about a plurality of axes whereby a desirable axis of the ferrite crystal is alignable with a magnetic field applicable at least within the aperture. In this regard, the aperture may be cylindrically shaped and the ferrite crystal may be spherical.

In one embodiment, the ferrite crystal including pure or doped YIG. However, the crystal may include other pure or doped ferromagnetic materials such as, for example, NiZn, MgMn, and LiZn.

The ferrite crystal resonator coupling structure also includes a coupling member that extends between a first end and a second end thereof across at least a portion of the first opening of the aperture. An electric current is directable through the coupling member. The coupling member may include one or more electrically conductive lines or even a wire mesh.

Advantageously, the ferrite crystal resonator coupling structure may include a coupling substrate on the first side of the circuit substrate. In this regard, the coupling member may include one or more electrically conductive lines formed, preferably by an etching and metallization process, on a first side of the coupling element that faces the first side of the coupling substrate. The coupling element may be configured to restrict movement of the ferrite crystal within the aperture toward the first opening of the aperture. The coupling element may be a Metallic etched loop, a wire, a substrate with printed or etched lines on a flexible, soft or hard substrate or a wire mesh. In this regard, the coupling element may have a hole in the first side thereof for receiving a portion of the ferrite crystal. The hole in the coupling element may be aligned with the first opening of the aperture in the circuit substrate and may be smaller in cross-sectional area than the cross-sectional area of the first opening of the aperture.

The aperture in the circuit substrate may also be configured to restrict movement of the ferrite crystal within the aperture toward the first opening of the aperture. In this regard, the aperture may be tapered between a larger second opening on the second side of the circuit substrate to a smaller first opening on the first side of the circuit substrate. It is also possible to configure the coupling member to restrict movement of the ferrite crystal within the aperture toward the first opening of the aperture. In this regard, the coupling element may include one or more electrically conductive lines (e.g., etched from flat strip of metal) that include an arcuate section conforming to and spaced away from the outer surface of the ferrite crystal.

The ferrite crystal resonator coupling structure may also beneficially include a structure for applying a rotational force to the ferrite crystal, preferably a frictional rolling force applied directly to the surface of the ferrite crystal. In this regard, the structure may include a rotateable element, preferably a circular plate, having a first surface contactable with the ferrite crystal. For example, the rotateable element may be positioned such that the first surface of thereof faces the second side of the circuit substrate and covers the second opening of the aperture. The structure may also include a drive shaft which can be coupled with a motor for applying rotational force to the rotateable element. When a motor coupled with the drive shaft is operated, the drive shaft applies a rotational force to the rotateable element which in turn applies a frictional rolling force to the surface of the ferrite crystal. Since lateral movement of the ferrite crystal is restricted by the sides of the aperture, the crystal rotates about an axis of rotation substantially parallel to the first surface of the rotateable element. By controlling operation of the motor, the crystal may be incrementally rotated until a desired axis of the crystal is aligned with the magnetic field.

In one particularly advantageous arrangement, the first surface of the rotateable element may be configured to periodically or randomly initiate shifting of the ferrite crystal to a different rotation axis. For example, there may be one or more scallops, serrations, ridges, grooves or the like formed on the first surface of the rotateable element. As the rotateable element is rotated, when the ferrite crystal encounters one of the scallops, serrations, ridges or grooves, it receives a slight force that shifts the crystal to a new axis of rotation. In this manner, multiple orientations of the crystal with respect to the magnetic field may be easily investigated. The rotateable element may also be configured to achieve efficient application of rotational force from the rotateable element to the ferrite crystal. For example, there may be a circular channel having a hemispherical cross-section configured for receiving at least a portion of the ferrite crystal formed in the first surface of the rotateable element. The channel increases the amount of surface area of the rotateable element in contact with the surface of the ferrite crystal thereby enhancing application of rotational force from the rotateable element to the crystal.

The structure for applying rotational force to the ferrite crystal may also be configured in other manners. For example, the structure may include a section of laterally movable material (e.g., a thin plastic strip or sheet) disposed on the second side of the circuit substrate and having a first surface thereof in contact with the ferrite crystal. The section of movable material may be moved laterally by pulling on one end of the strip or sheet relative to the ferrite crystal to apply a frictional rolling force directly to the surface of the ferrite crystal. The sheet or strip of material may be configured to periodically or randomly initiate shifting of the ferrite crystal to a different rotation axis by, for example, including one or more scallops, serrations, ridges, grooves or the like on the first surface of the sheet or strip.

The ferrite crystal may be permanently fixed in an orientation wherein a desirable axis of the ferrite crystal is aligned with the magnetic field, once such an orientation is found, by introduction of an adhesive material into the aperture. The adhesive material may, for example, include a quick curing epoxy with or without a slow curing epoxy. In addition to fixing the ferrite crystal in the desired orientation, the adhesive material may also be selected to serve to dampen or eliminate undesirable magneto-acoustic vibrations of the ferrite crystal.

The ferrite crystal resonator coupling structure may also include an electromagnetic coil that is operable to supply at least a portion of the magnetic field applicable at least within the aperture. The electromagnetic coil may be disposed about a core having a central axis that is substantially parallel with and laterally spaced away from a central axis of the aperture. In this regard, the central axis of the core of the electromagnet and the central axis of the aperture may be laterally spaced away from each other by a distance of several ferrite crystal diameters. The ferrite crystal resonator coupling structure may further include a permanent magnet that supplies a portion of the magnetic field and a pole tip with a central axis co-axial with the central axis of the aperture.

The permanent magnet may be connected to a first member including a ferromagnetic material that is disposed on the first side of the circuit substrate. The first member may be spaced apart from a second member including a ferromagnetic material that is disposed on the second side of the circuit substrate. The core of the electromagnet may connect the first and second members so that the first and second members and the core of the electromagnet cooperatively provide a magnetic return path for the magnetic field.

The ferrite crystal resonator coupling structure may be open, or it may be disposed within an enclosure. The enclosure may be include a material that is substantially impermeable to magnetic fields such as, for example, any sufficiently conductive magnetic stainless steel. This provides for shielding of the multiple ferrite crystal resonator coupling structure from the influence external magnetic fields, including influence due to its orientation with respect to the earth's magnetic field.

According to further aspects of the present invention, the ferrite crystal resonator structure may easily be configured as an oscillator or a filter. In this regard, a second coupling member that extends across the second opening of the aperture may be included in the resonator in order to configure the resonator as, for example, a band-pass a filter. As another example, a band-reject filter may be achieved by connecting a plurality of ferrite crystal resonator coupling structures in series with one another. To configure the resonator as an oscillator, an appropriate active element having a terminal thereof electrically connected to the first end of the coupling member may be included in the resonator in order configure it as an oscillator. In this regard, the active element may include a device capable of amplification or intrinsic or induced negative resistance and having two or more terminals such as, for example, a bipolar transistor having an emitter, base, or collector terminal thereof electrically connected to the first end of the coupling member, a field effect transistor (FET) having either its drain, source or gate terminal thereof electrically connected to the first end of the coupling member, or a negative resistance diode having a terminal thereof electrically connected to the first end of the coupling member. The active device may be a packaged device that is mounted on the circuit substrate or it may be a chip device formed on the circuit substrate.

According to yet another aspect of the present invention, a multiple ferrite crystal resonator coupling structure includes a first circuit substrate and a second circuit substrate. The first circuit substrate includes a first side, a second side opposite the first side, and a first aperture. The first aperture extends through the first circuit substrate between a first opening of the first aperture on the first side of the first circuit substrate to a second opening of the first aperture on the second side of the first circuit substrate. The second circuit substrate includes a first side, a second side opposite the first side, and a second aperture. The second aperture extends through the second circuit substrate between a first opening of the second aperture on the first side of the second circuit substrate to a second opening of the second aperture on the second side of the circuit second substrate. The first aperture is configured to permit rotation of a first ferrite crystal disposable at least partially therein about a plurality of axes whereby a desired axis of the first ferrite crystal is alignable with a first magnetic field applicable at least within the first aperture. Likewise, the second aperture is configured to permit rotation of a second ferrite crystal disposable at least partially therein about a plurality of axes whereby a desired axis of the second ferrite crystal is alignable with a second magnetic field applicable at least within the second aperture.

The multiple ferrite crystal resonator coupling structure also includes a first coupling member extending between a first end and a second end thereof across at least a portion of the first opening of the first aperture through which a first electric current is directable, and a second coupling member extending between a first end and a second end thereof across at least a portion of the first opening of the second aperture through which a second electric current is directable. In this regard, the first coupling member may include one or more electrically conductive lines formed on a first surface of a first coupling substrate facing the first side of the first circuit substrate, and the second coupling member may include one more electrically conductive lines formed on a first surface of a second coupling substrate facing the first side of the second circuit substrate.

The multiple ferrite resonator coupling structure may be open, or it may be disposed within an enclosure. In order to provide for shielding of the multiple ferrite crystal resonator coupling structure from the influence external magnetic fields, including influence due to its orientation with respect to the earth's magnetic field, the enclosure may include a material that is substantially impermeable to magnetic fields such as, for example, any sufficiently conductive magnetic stainless steel. Further, the enclosure may be configured to provide for isolation between the ferrite crystals within the multiple ferrite crystal resonator coupling structure. In this regard, the enclosure may include separate compartments for each ferrite crystal resonator coupling structure.

According to an additional aspect of the present invention, alignment of the ferrite crystal with the magnetic field in the ferrite crystal resonator coupling structures may be automated. In this regard, the ferrite crystal resonator coupling structure may be coupled to a computer controlled automatic alignment system operable to cause rotation of the ferrite crystal in a controlled incremental fashion until a desired axis of the ferrite crystal is aligned with the magnetic field. The computer controlled automatic alignment system may include a control computer, a motor controller, a motor, a main coil sweep unit and output instrumentation (e.g., a scalar network analyzer, a frequency counter, a spectrum analyzer and a power meter). The motor controller is interfaceable with the control computer, and the motor is connectable with the motor controller and operable to generate a force for rotating the ferrite crystal. The main coil sweep unit is interfaceable with the control computer and operable to supply a variable electrical current to the ferrite crystal resonator coupling structure. The output instrumentation is interfaceable with the control computer and connectable with the ferrite crystal resonator coupling structure. Using feedback information from the output instrumentation, the control computer directs the main coil sweep unit and the motor controller to achieve alignment of a desired axis of the ferrite crystal with the magnetic field.

The single and multiple ferrite crystal coupling structures of the present invention achieve many advantages including minimizing assembly and test costs, allowing for the use of less expensive packaged devices, and eliminating the need for hermetic sealing of the circuit incorporating the resonator. These and other aspects and advantages of the present invention will be readily apparent to one skilled in the art from the following figures, which constitute part of the present disclosure and serve to explain the exemplary embodiments discussed herein.

DESCRIPTION OF THE DRAWINGS

For a more complete understanding of the present invention and the advantages thereof, reference is now made to the following detailed description taken in conjunction with the accompanying drawings, wherein like referenced numeral represent like parts, in which:

FIG. 4 is a perspective view of a conventional alignable YIG resonator structure;

FIG. 5A is a perspective view of one embodiment of a single-pole YTO coupling structure in accordance with the present invention;

FIG. 12 shows an end cross-sectional view of an embodiment of a single-pole YTO coupling structure in accordance with the present invention having a laterally movable element for achieving rotation of a YIG sphere in accordance with the present invention;

FIG. 14A shows a side cross-sectional view of one embodiment of a band-reject filter structure in accordance with the present invention; and FIG. 14B shows a side cross-sectional view of one embodiment of a bandpass filter structure in accordance with the present invention.

DETAILED DESCRIPTION

Single-Pole YTO Coupling Structure

Figure 1:
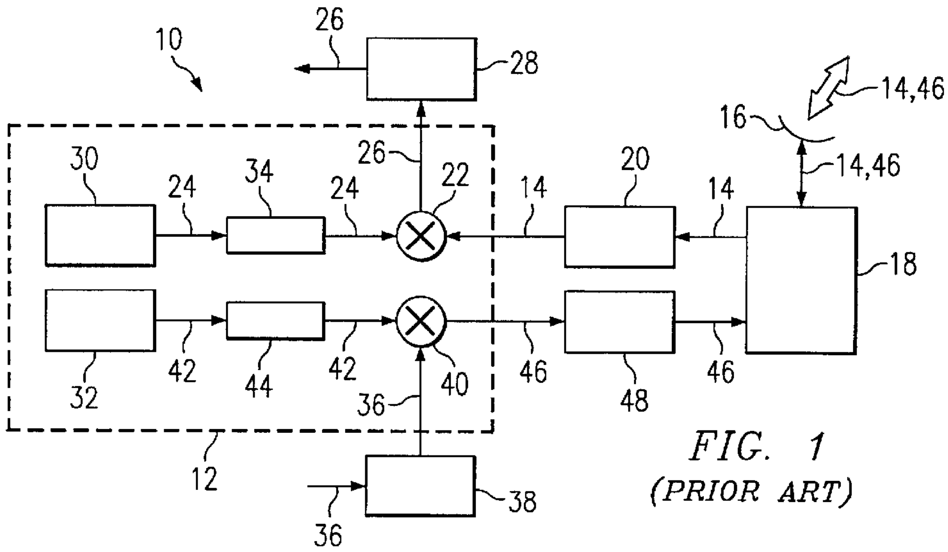
FIG. 1 (PRIOR ART)
FIG. 1 is a block diagram of a conventional FDMA transceiver.
Figure 2:
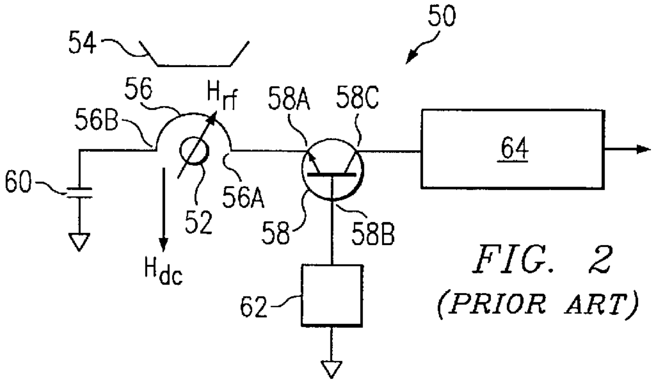
FIG. 2 (PRIOR ART)
FIG. 2 is a schematic diagram of a conventional YTO circuit.
Figure 3A:
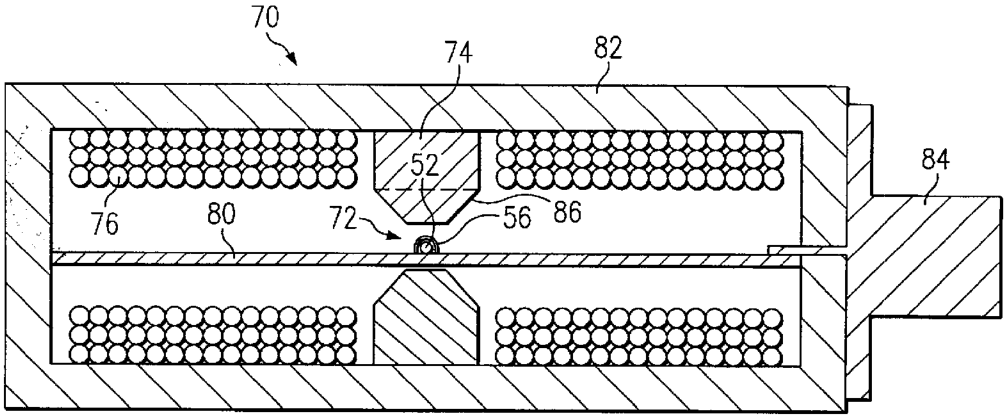
FIG. 3A (PRIOR ART)
FIG. 3A is a side cross-sectional view of a conventional YTO coupling structure.
Figure 3B:
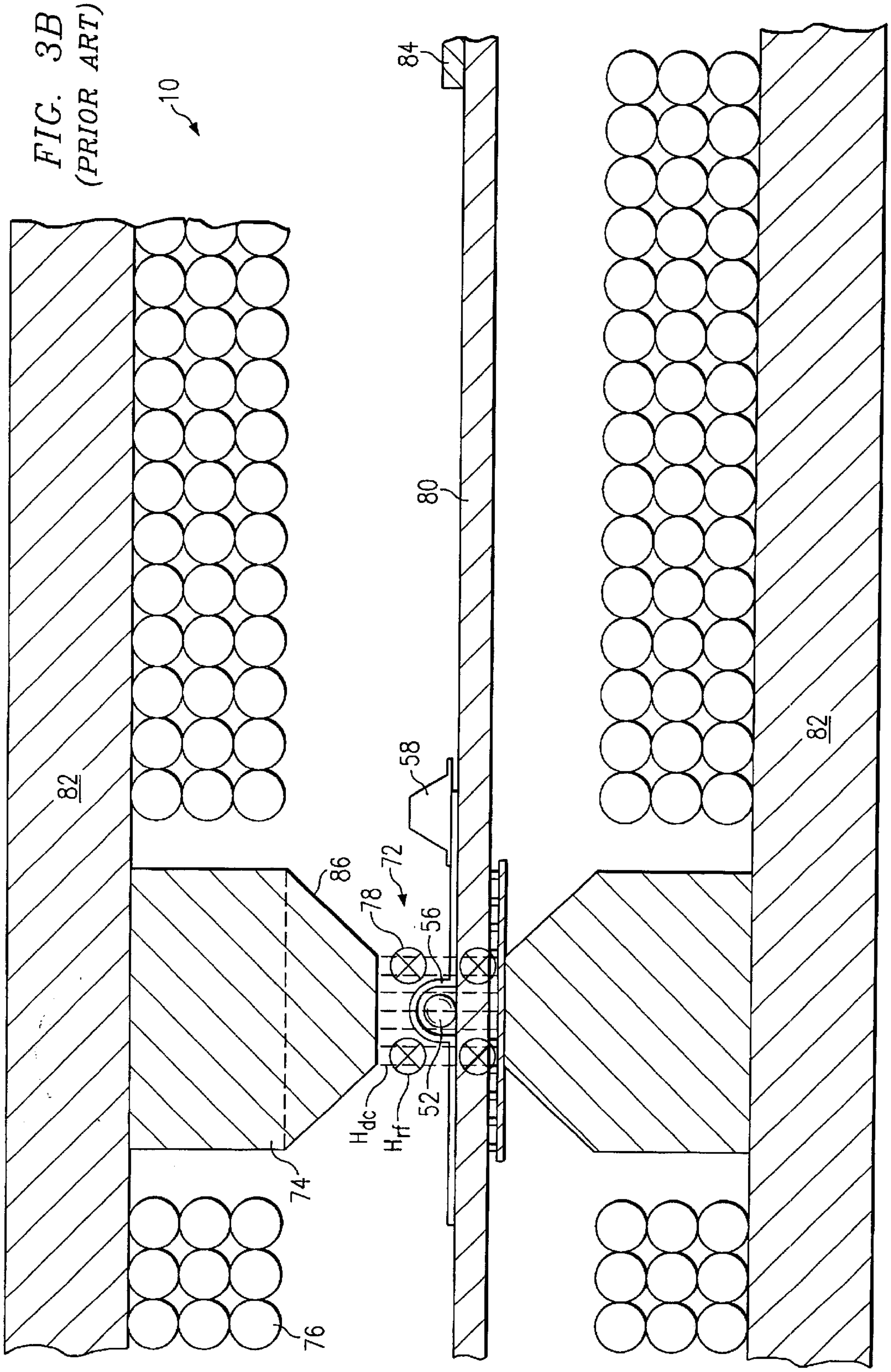
FIG. 3B (PRIOR ART)
FIG. 3B is an enlarged view of the conventional YTO coupling structure of FIG. 3A.

FIGS. 5A–D show perspective, top cross-sectional, side cross-sectional views, and enlarged views respectively of one embodiment of a single-pole YTO coupling structure in accordance with the present invention. The single-pole YTO coupling structure 100 includes a circuit substrate 110 which may, for example, include a microstrip substrate or stripline substrate including a dielectric that is metallized on one side or both sides. A coupling substrate 120 and a packaged transistor 130 are disposed on an upper surface of the circuit substrate 110. The circuit substrate 110, coupling substrate 120 and packaged transistor 130 are positioned between a lower ferromagnetic base plate member 140 and an upper ferromagnetic plate member 142. The lower and upper plates 140, 142 are connected to one another by a ferromagnetic connecting member 144 in contact with the lower and upper plates 140, 142 proximate to first sides thereof.

The YTO coupling structure 100 may also include a permanent magnet 160 non-coaxially arranged with respect to an electromagnetic coil 170. In addition, there may also be a pole tip 162. The permanent magnet 160 is connected to the upper plate 142 proximate to a second side thereof opposite the first side with the pole tip 162 positioned above the coupling substrate 120. As is illustrated, the electromagnetic coil 170 may be coiled about the connecting member 144. As may be appreciated, the electromagnetic coil 170 may be positioned elsewhere within the magnetic loop, including coaxial with and coiled about the permanent magnet 160.

The circuit substrate 110 includes an aperture 112 that extends therethrough from a lower opening on the lower surface of the circuit substrate 110 to an upper opening on the upper surface of the circuit substrate 110. In this regard, the aperture 112 may be cylindrically shaped as is illustrated. The aperture 112 includes a central axis 114 that is substantially aligned with a central axis 164 of the permanent magnet 160. As is shown, the connecting member 144, which functions as the core of the electromagnetic coil 170 and as the magnetic return path for the magnetic field in the pole gap, may be laterally spaced away from aperture 112 and typically substantially parallel to the axis 114 of the aperture 112.

The coupling substrate 120 is positioned over the aperture 112 in the circuit substrate 110. The coupling substrate may include an aperture 124 extending therethrough from a lower opening on the lower surface of the coupling substrate 120 to an upper opening on the upper surface of the coupling substrate 120. The aperture 124 in the coupling substrate 120 is axially aligned with the aperture 112 in the circuit substrate 110. The aperture 124 in the coupling substrate 120 may be, for example, cylindrically shaped or conically shaped and smaller in cross-sectional diameter than the aperture 112 in the circuit substrate 110.

A pair of electrically conductive coupling lines 122 are provided on the lower surface of the coupling substrate 120, e.g., by an etching/deposition process. In this regard, the coupling lines 122 may include an electrically conductive material such as, for example, copper, aluminum, gold, or any conductive alloy. The coupling lines 122 may be provided with an outside dielectric coating approximately 2–3 mils thick. The coupling substrate 120 is positioned with respect to the circuit substrate 110 such that the coupling lines 122 extend from first ends 122A thereof to second ends 122B thereof across the upper opening of the aperture 112 in the circuit substrate 110. The first ends 122A of the coupling lines 122 are soldered to an electrically conductive pad with strip 116, shown in FIG. 10C, on the upper surface of the circuit substrate 110, and the second ends 122B of the coupling lines are soldered to an electrically conductive pad with strip 118, shown in FIG. 10C, on the upper surface of the circuit substrate 110. In this regard, the electrically conductive pad with strip 116 and the electrically conductive pad with strip 118 may include an electrically conductive material such as, for example, copper, aluminum, gold, or an electrodeposited substrate metallization.

Figure 6A:
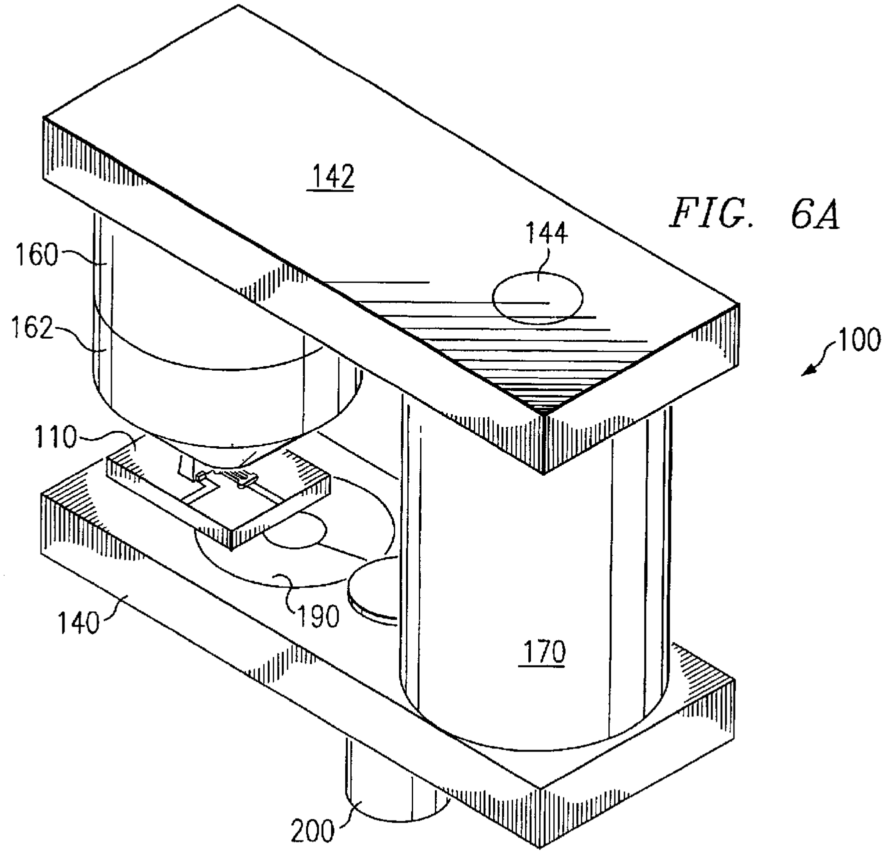
FIGS. 6A–C show perspective, enlarged perspective and enlarged side views, respectively, of one embodiment of a single-pole YTO coupling structure without a coupling substrate in accordance with the present invention.
Figure 6B:
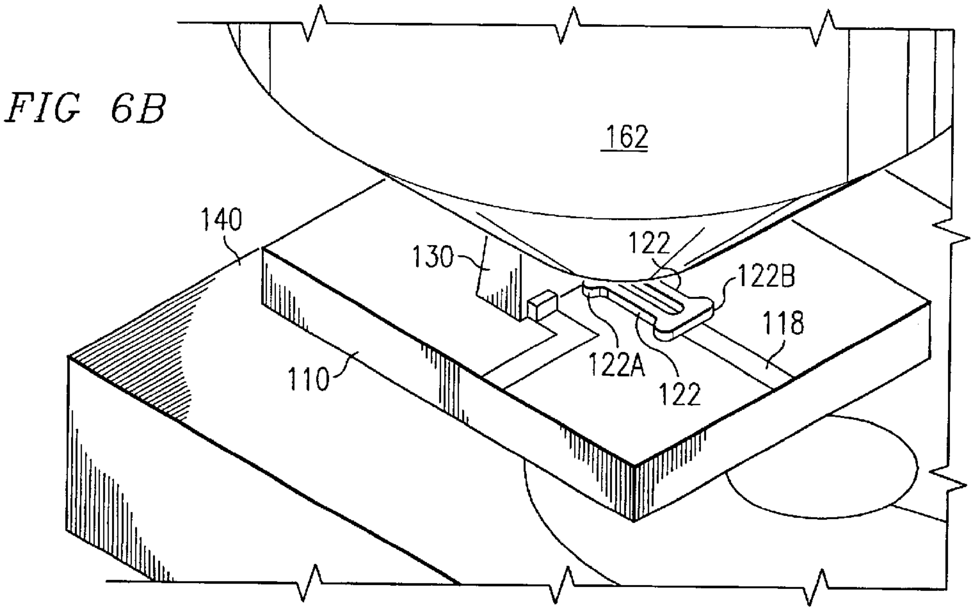
Figure 6C:
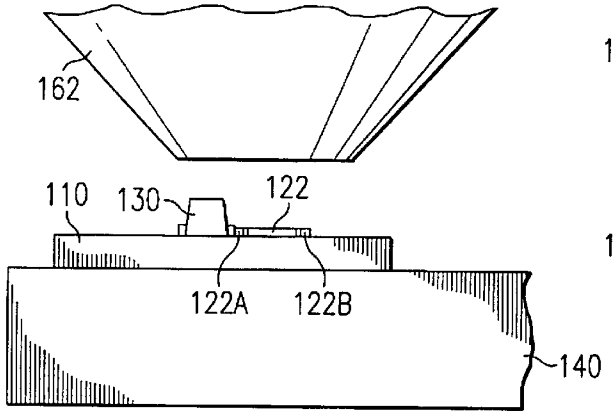

It should be appreciated that the coupling structure 100 need not include the coupling substrate 120. As is shown in FIGS. 6A–C, the coupling lines 122 may be freestanding. In this regard, the coupling lines 122 may be etched from an electrically conductive material and may have an outside dielectric coating approximately 2–3 mils thick. There may be as few as one coupling line 122, two coupling lines 122 (as is shown), multiple coupling lines 122, or even a wire mesh extending between first and second conductive pads 122A and 122B which are soldered to the electrically conductive pad with strip 116 and electrically conductive pad with strip strip 118, respectively, on the upper surface of the circuit substrate 110. The coupling structure can be etched or plated on a flexible substrate.

Referring again to FIGS. 5A–D, a single crystalline YIG material that is pure or doped with other materials such as, for example, with gallium, and is ground to a generally spherical configuration (hereafter the YIG sphere 180) is disposed within the aperture 112 in the circuit substrate 110 where its x, y, and z motions are restricted. It should be appreciated that, the crystal 180 may include pure or doped ferromagnetic materials other than YIG such as, for example, NiZn, MgMn or LiZn. The YIG sphere 180 and aperture 112 are appropriately sized to permit the YIG sphere 180 to rotate about a plurality of axes while positioned within the aperture 112. In this regard, the YIG sphere 180 may have a diameter in the range of about 0.005 or greater inches, and the aperture 112 may have a cross-sectional diameter at least slightly greater than the diameter of the YIG sphere 180. The YIG sphere 180 is supported within the aperture 112 by the upper surface of a rotateable plate 190 disposed on the upper surface of the lower ferromagnetic plate 140. An upper portion of the YIG sphere 180 may extend upward between the coupling lines 122 and into the aperture 124 in the coupling substrate 120. There may be a non-conductive film between the YIG sphere 180 and the coupling substrate 120. In this regard, the surface of the YIG sphere 180 may be coated with a dielectric in order to inhibit undesired electrical contact with the coupling lines 122. Upward movement (in the z-axis direction) of the YIG sphere 180 may be restricted by contact of the exterior surface of the YIG sphere 180 with the coupling substrate 120.

Figure 5B:
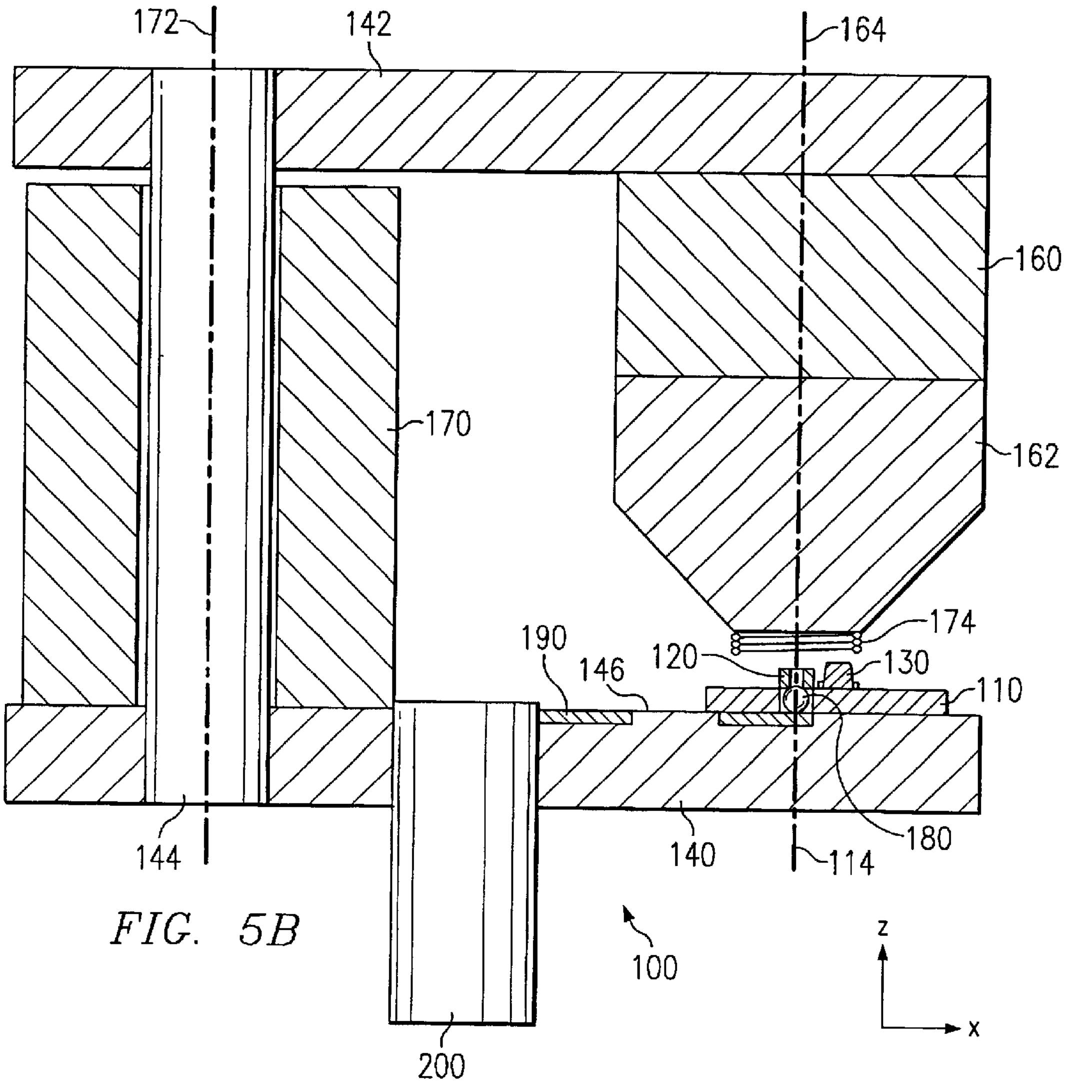
FIG. 5B is a side cross-sectional view of the single-pole YTO coupling structure taken along line A—A in FIG. 5A.
Figure 5C:
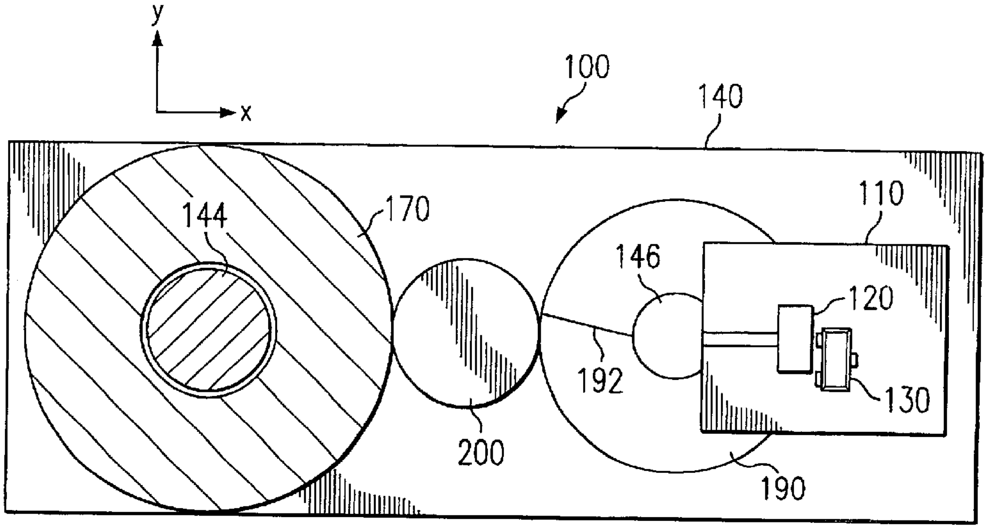
FIG. 5C is a top cross-sectional view of the single-pole YTO coupling structure taken along line B—B in FIG. 5A.
Figure 5D:
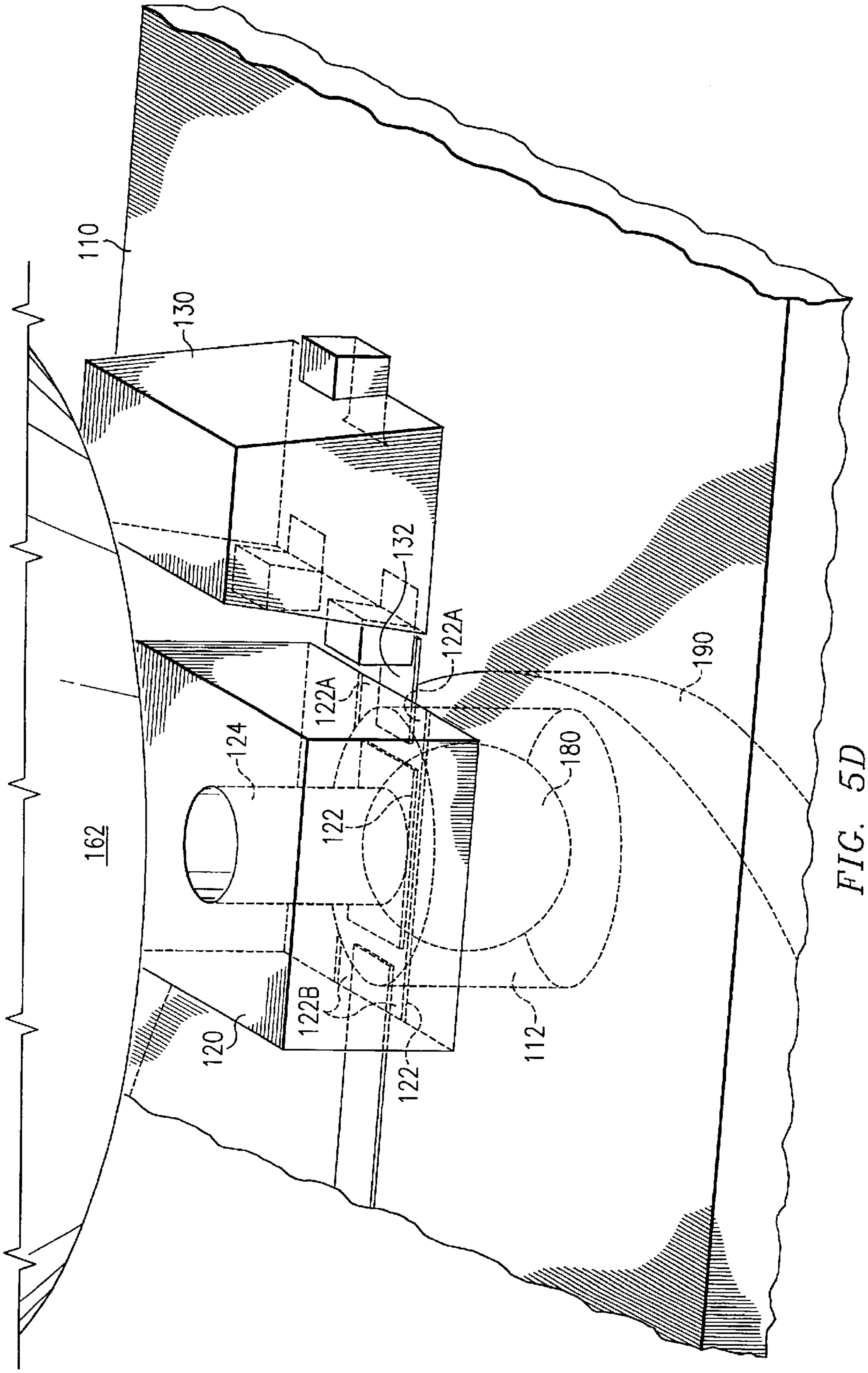
FIG. 5D is an enlarged perspective view of the single-pole YTO coupling structure of FIG. 5A viewed from the opposite side.
Figure 5E:
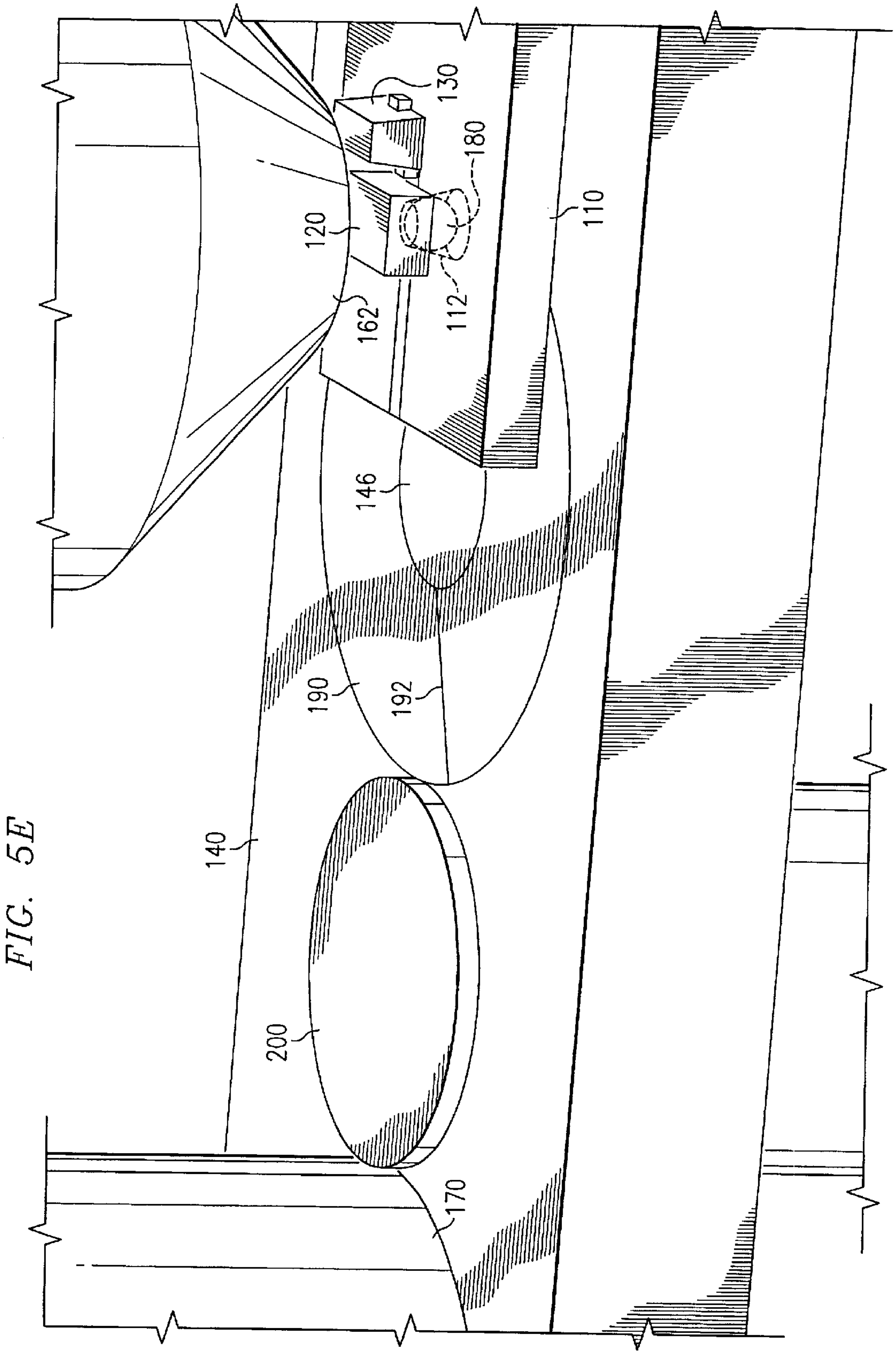
FIG. 5E is a perspective view of a portion of a single-pole YTO coupling structure in accordance with the present invention having a tapered aperture.
Figure 5F:
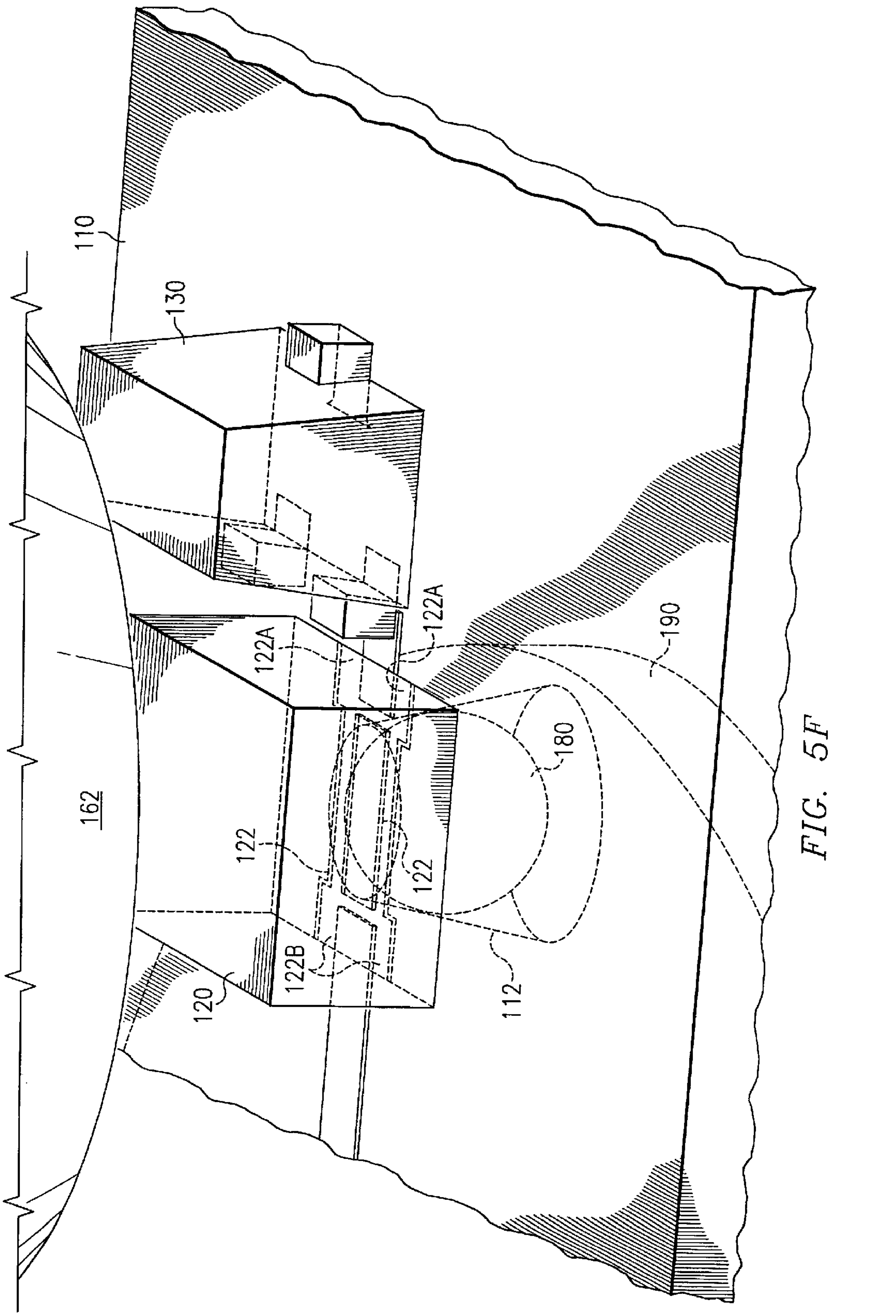
FIG. 5F is an enlarged perspective view of the single-pole YTO coupling structure shown in FIG. 5E.

As is illustrated in FIGS. 5E–F, instead of being right circular cylindrically shaped, the aperture 112 in the circuit substrate 110 may be a tapered cylinder extending between a larger diameter opening on the lower surface of the circuit substrate 110 and a smaller diameter opening on the upper surface of the circuit substrate 110. The taper of the aperture 112 there between may be such that upward movement of the YIG sphere 180 is restricted by contact of the outer surface of the YIG sphere 180 with the walls of the tapered cylindrical aperture 112. In this regard, the taper may be such that no portion of the YIG sphere 180 extends out of the upper opening of the aperture 112 thereby permitting the parallel coupling lines 122 to be positioned more closely to one another and eliminating the need for the aperture 124 in the coupling substrate 120.

Figure 7:
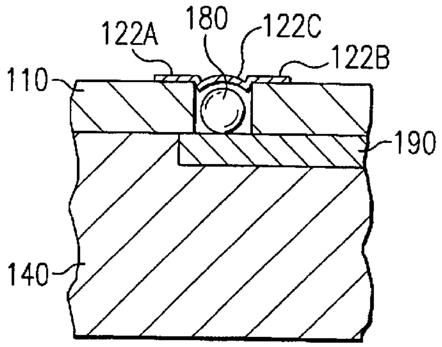
FIG. 7 shows a cross-sectional view of one embodiment of a single-pole YTO coupling structure having a coupling line configured to restrict upward movement of and provide enhanced uniformity of coupling with a YIG sphere in accordance with the present invention.

Referring now to FIG. 7, the coupling lines 122 may be configured to both restrict upward movement of the YIG sphere 180 and provide for enhanced uniformity of coupling between the YIG sphere 180 and the coupling lines 122. In this regard, the coupling lines 122 may extend downward into the aperture 112 and include an arcuate section 122C disposed at least partially within the aperture 112. The arcuate section 122C is configured to conform to the outer circumference of YIG sphere 180 and is spaced away from the outer surface of the YIG sphere 180. By conforming to the outer circumference of YIG sphere 180, the arcuate section 122C provides a substantial length of the coupling line 122 that is equidistant from the surface of the YIG sphere 180, thereby providing for enhanced uniformity of coupling between the YIG sphere 180 and the coupling lines 122.

Figure 8A:
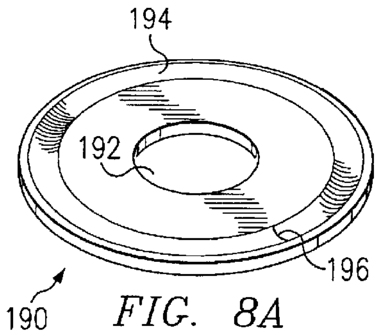
FIGS. 8A–C show perspective, top, and side cross-sectional views, respectively, of one embodiment of a rotateable plate of the YTO coupling structure.
Figure 8B:
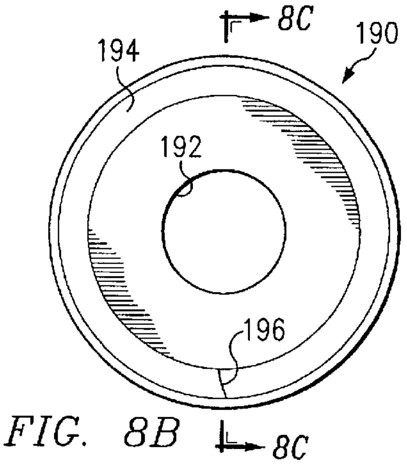
Figure 8C:
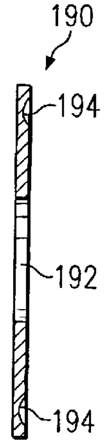

As is shown in FIGS. 8A–C, the rotateable plate 190 may, for example, be shaped as a right circular cylinder with a concentric axial hole 192. It will be appreciated that the rotateable plate may be differently configured such as, for example as a solid right circular cylinder. To enhance contact between the upper surface of the rotateable plate 190 and the YIG sphere 180, the upper surface of the rotateable plate may include a non-radial channel 194 configured for receiving at least a portion of the YIG sphere 180. In this regard, the non-radial channel 194 may be circular and may have a semi-circular cross section as is shown.

Referring again to FIGS. 5A–D the rotateable plate 190 is positioned within a correspondingly configured channel in the lower ferromagnetic plate 140 for rotation about a spindle portion 146 of the lower ferromagnetic plate 140 that is received in the concentric axial hole 192 of the rotateable plate 190. There may be a drive shaft 200 extending through a hole in the lower ferromagnetic plate 140. The periphery of the rotateable plate 190 is engaged (e.g., frictionally or via gear teeth), with the periphery of the drive shaft 200. The drive shaft 200 is connectable with a motor (e.g., a servo or stepper motor) for applying a rotational force to the drive shaft 200, which in turn provides a rotational force to the rotateable plate 190.

The asymmetrically arranged permanent magnet 160 and the electromagnetic coil 170 cooperatively provide the DC magnetic field $H_{dc}$ within the aperture 112 of the circuit substrate 110 necessary for resonance in the YIG sphere 180. The lower ferromagnetic plate 140, upper ferromagnetic plate 142, and connecting member 144 include a ferromagnetic material in order to provide a magnetic return path for the DC magnetic field $H_{dc}$ supplied by the permanent magnet 160 and electromagnetic coil 170. Appropriate ferromagnetic materials include, for example, pure iron or alloys such as Carpenter Hi-Perm 49 or Carpenter Hi-Perm 80 commercially available from Carpenter Technology Corporation of Reading, Pa.

The permanent magnet 160 supplies a fixed intensity portion of the DC magnetic field $H_{dc}$, and the electromagnetic coil 170 supplies a variable intensity portion of the DC magnetic field $H_{dc}$. In addition to the electromagnetic coil 170, there may be an FM (frequency modulation) coil 174, typically of fewer turns than electromagnetic coil 170 and typically air mounted near the YIG sphere 180 as is shown in FIG. 5B (the FM coil 174 has not been shown in FIGS. 5A and 5C–F for purposes of more clearly illustrating other features). The FM coil 174 provides for fine frequency tuning, phase locking, and frequency modulation via an external signal. The intensity of the DC magnetic field $H_{dc}$ supplied by the permanent magnet 160 and two electromagnetic coils 170, 174 within the aperture 112 causes the YIG sphere 180 to resonate at a particular frequency. The intensity of the portion of the DC magnetic field $H_{dc}$ supplied by the electromagnetic coils 170, 174 may be varied by varying the amount of current through the coils of the electromagnetic coils 170, 174 to adjust the resonant frequency of the YIG sphere 180. In this regard, the electromagnetic coils 170, 174 are connectable with variable current sources.

A desirable axis, preferably a thermally compensated axis, of the YIG sphere 180 is alignable with the DC magnetic field $H_{dc}$ in the following manner. When the drive shaft 200 is turned, the drive shaft 200 causes rotation of the rotateable plate 190. It will be appreciated that in other embodiments, the coupling structure 100 may not include a drive shaft. In such instances, the rotateable plate 190 may be directly coupleable with a motor for rotation thereof.

Rotation of the rotateable plate 190 applies a force, generally in the direction of the illustrated y-axis, to the surface portion of the YIG sphere 180 contacting the upper surface of the rotateable plate 190. Since lateral and vertical movement of the YIG sphere 180 is restricted, the force applied to the YIG sphere 180 by the rotateable plate 190 causes the YIG sphere 180 to rotate about an axis perpendicular to the direction of the applied force, generally in the direction of the illustrated x-axis. As is described more fully below in connection with FIG. 9, the operation of the motor may be controlled to effect angular rotation of the YIG sphere 180 by a specified amount and then paused; in other words it is controlled in an incremental fashion. During the pause testing is conducted to determine whether a suitable desirable axis of the YIG sphere 180 is sufficiently aligned with the DC magnetic field $H_{dc}$.

Since it is possible that the YIG sphere 180 may be completely rotated about its present axis of rotation without finding a suitable desirable axis, it may be necessary to change the orientation of the YIG sphere 180 so that it rotates about a different axis of rotation as the rotateable plate 190 is rotated after all the possibilities of the present axis are exhausted. In this regard, the rotateable plate 190 may have one or more grooves 196 (shown in FIGS. 8A and 8B), scallops, ridges, serrations or the like for periodically causing the YIG sphere 180 to shift it axis of rotation. In this regard, each groove 196 (shown in FIGS. 8A and 8B) or the like may be angularly spaced apart from one another by an amount corresponding to the circumference of the YIG sphere 180. Thus, when the YIG sphere 180 has been completely rotated with no axis being identified, the YIG sphere 180 encounters one of the grooves 196. Contact with the groove 196 causes the YIG sphere 180 to change its orientation so that it has a new rotational axis. Thus, as the testing continues, the YIG sphere 180 is now being checked around an entirely new axis. In this manner, an infinite plurality of orientations can be easily tested to find a suitable desirable axis in alignment with the applied DC magnetic field $H_{dc}$. The process can continue automatically (i.e., without operator intervention) until some preset time limit at which point the YIG sphere can be discarded and a new YIG sphere substituted, if necessary.

Once the YIG sphere 180 is aligned as needed, a drop of an adhesive material (e.g., a non-conductive thermosetting or ultraviolet cured epoxy) may be introduced into the aperture 112. The adhesive may, for example, be introduced through the aperture 124 in the coupling substrate 120. This adhesive coats the YIG sphere 180 and attaches it to the circuit substrate 110. The adhesive fixes the YIG sphere 180 in the desired orientation thereby reducing or eliminating the possibility that mechanical shocks and vibration of the YTO oscillator structure 100 will displace the orientation of the YIG sphere 180 degrading its performance. Further, the adhesive facilitates the absorption and attenuation of magneto-acoustic vibrations of the YIG sphere 180 into the circuit substrate 110, resulting in a cleaner, more reliable oscillator free from phase pops.

Referring now to FIG. 12, it will be appreciated that structures other than the rotateable plate 190 and drive shaft 200 may be incorporated into the YTO coupling structure 100 for achieving rotation of the YIG sphere 180. In the embodiment shown in FIG. 12, the YTO coupling structure 100 includes a laterally movable element 210 between the circuit substrate 110 and the lower ferromagnetic plate 140. The laterally movable element 210 may wrap around the sides of the lower ferromagnetic plate 140. In this regard, the laterally movable element 210 may include a flexible material (e.g., a thin strip or sheet of plastic). As indicated by arrows 212, the laterally movable element 210 is laterally movable relative to the YIG sphere 180 by pulling on one end of thereof. Each end of the laterally movable element 210 may, for example, be wound around separate reels (not shown) that are engageable with a controllable drive unit in a similar manner to a cassette tape in order to provide for controlled movement of the laterally movable element 210. Since lateral movement of the YIG sphere 180 is restricted within the aperture 112, when the laterally movable element 210 is moved, the upper surface of the laterally movable element 210 applies a frictional force to the YIG sphere 180 causing it to rotate. As with the rotateable plate 190, the upper surface of the laterally movable element 210 may include one or more grooves, scallops, ridges, serrations or the like (not shown) to occasionally initiate shifting of the YIG sphere 180 to a new rotation axis, and it may include a channel (not shown) for enhancing contact with the YIG sphere 180. Once a desirable axis has been found, the YIG sphere may be fixed in place with an adhesive and the ends of the laterally movable element 210 may be cut free from the section remaining under the circuit substrate 110 adjacent to the edges of the circuit substrate 110 where indicated by arrows 214.

The advantages provided by the YTO structure 100 of the present invention are many. For example, testing may proceed automatically without need for operators, thus saving on labor costs. Also, testing under machine control is faster and more time efficient. Further, since the YIG sphere 180 is not fixed on the end of a rod, many more axes may be checked increasing sphere yield considerably. Also, since there is no need for an expensive rod or clamp to be installed in the YTO structure 100 of the present invention, materials and assembly labor costs are reduced. Another great advantage is that substantially all the electronic assembly can be accomplished by automated surface mount technology, further minimizing assembly costs. A further advantage is that the entire structure can be non-hermetic, significantly reducing packaging costs.

Figure 13:
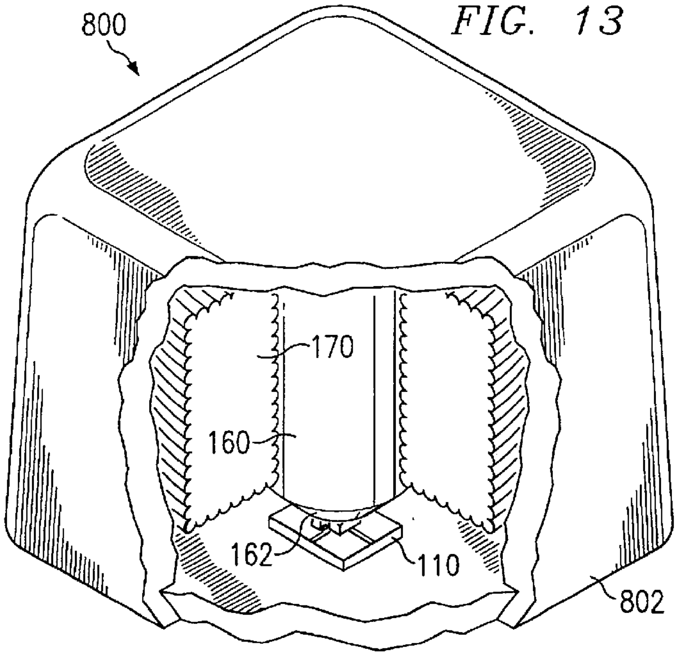
FIG. 13 shows a perspective view in partial cut-away of one embodiment of an enclosed single pole YTO in accordance with the present invention.

As is shown in FIG. 13, a single-pole YTO 800 in accordance with the present invention may also be disposed within an enclosure 802 where desired. In order to provide a more compact unit, the enclosed single-pole YTO 800 may be configured slightly differently than the open single-pole YTO 100. In this regard, rather than having the electromagnetic coil 170 disposed laterally with respect to the aperture 112 in the circuit substrate 110, the electromagnetic coil 170 may be positioned in series with the permanent magnet 160/pole tip 162 combination. The enclosure 802, which may, for example, include a magnetic stainless steel, provides the magnetic return path for the DC magnetic field provided by the permanent magnet 160 and electromagnetic coil 170.

It should be appreciated that in the previously described embodiments, the packaged transistor 130 need not be included, in which case the YTO coupling structure 100 includes simply a YIG resonator which may be connected with additional circuitry external to the YIG resonator. Further, although referred to as a YTO coupling structure 100, it should be appreciated that the coupling structure is not specifically restricted to YIG and is, in general, a ferrite crystal turned circuit.

The ferrite tuned crystal circuit may be part of, for example, an oscillator, a band-pass filter, a band-reject filter, a multiplier, or a phase shifter. In this regard, FIG. 14A shows a side cross-sectional view of one embodiment of a band-reject filter structure 900 in accordance with the present invention. The band-reject filter 900 includes three YIG spheres 180 disposed in separate apertures 112 in a circuit substrate 110. It will be appreciated that the band-reject filter 900 may have more or fewer YIG spheres 180. The circuit substrate 110 is shown disposed on a lower ferromagnetic base plate 140 beneath a single magnetic pole tip 162. For purposes of illustration, structures for rotating the YIG spheres 180 (e.g., rotateable plates or laterally movable elements) have not been shown. Coupling lines 122 extending across upper ends of the apertures 112 are connected in series with one another. Signals at the resonant frequencies through the coupling lines 122 are absorbed by the YIG spheres 180 so that the output will contain minimal signals at the resonant frequencies.

The same basic ferrite crystal tuned circuit can also be used as a band-pass filter. In this regard, FIG. 14B shows side cross-sectional view of one embodiment of a band-pass filter structure 1000 in accordance with the present invention. The band-pass filter structure includes three YIG spheres 180 disposed within separate apertures 112 in a circuit substrate 110. It will be appreciated that there may be more or fewer YIG sphere 180. The circuit substrate 110 is shown disposed on a lower ferromagnetic base plate 140 beneath a single magnetic pole tip 162. For purposes of illustration, structures for rotating the YIG spheres 180 (e.g., rotateable plates or laterally movable elements) have not been shown. Associated with each aperture is a pair of coupling lines 122. An upper one of each pair of coupling lines 122 extends across the upper opening of its associated aperture 112 and a lower one of each pair of coupling lines 122 extends across the lower opening of its associated aperture 112. As is shown, the coupling lines 122 of each pair may be oriented in substantially orthogonal directions. Only one set of coupling lines, for example, the upper one of each pair of coupling lines 122, are in series. The others are perpendicular to these and are grounded on one side. Signals at the resonant frequencies through the upper coupling lines 122 are absorbed by the YIG spheres 180 and coupled into the lower coupling lines 122 so that the output from the lower coupling lines 122 includes signals at the resonant frequencies.

YTO Alignment System

Figure 9:
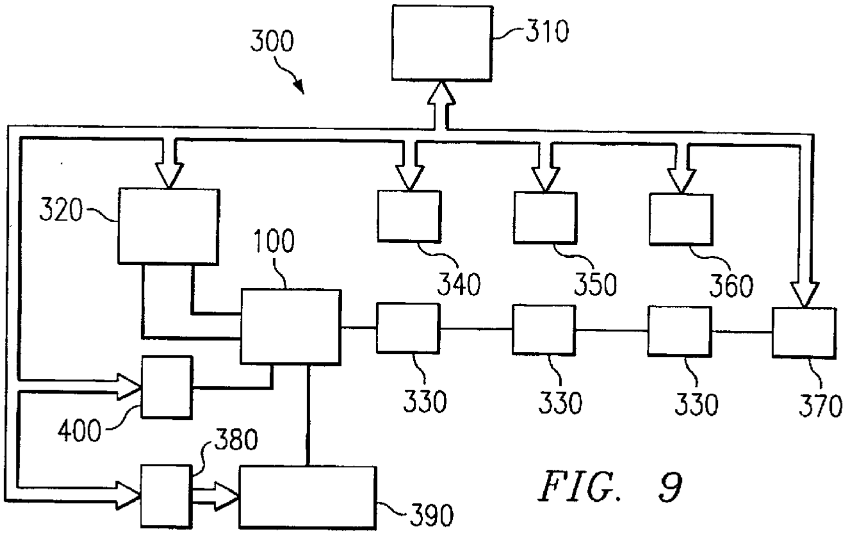
FIG. 9 is a block diagram of a YTO alignment system in accordance with the present invention.

Referring now to FIG. 9, there is shown a block diagram of an automatic alignment system 300 that may be used to automatically align the YIG sphere 180 of the YTO coupling structure 100 of the present invention. The automatic alignment system 300 includes a control computer 310 such as, for example, a personal computer that is used with general purpose interface bus (GPIB) control interface. The YTO coupling structure 100 under test is connected with a main coil sweep unit 320, which is connected with the control computer 310. The main coil sweep unit 320 may include a triangular sweep voltage generator, such as an HP 8620C main frame made by the Hewlett Packard Company, connected to a precision voltage-to-current converter circuit. The main coil sweep unit 320 tunes the YTO 100 over its desired frequency range by varying the current in the coils(s) of the electromagnetic coil 170 to proportionally vary the DC magnetic field $H_{dc}$ applied to the YIG sphere 180.

The output of the YTO 100 is fed to a series of directional couplers 330. One of the directional couplers 330 is connected to a scalar network analyzer 340, one is connected to a frequency counter 350, and one is connected to a spectrum analyzer 360 and power meter 370. The scalar network analyzer 340, frequency counter 350, spectrum analyzer 360, and power meter 370 are all also connected with the control computer 310. There is a servo or stepper motor controller 380 that is connected to the control computer 310 and a servo or stepper motor 390. The servo or stepper motor 390 is mechanically engageable with the drive shaft 200 of the YTO 100. Additionally, there is an infrared or similar focused heat source 400 that is connected to the control computer 310 and the YTD 100.

Operation of the automatic alignment system 300 proceeds in the following manner. The main coil sweep unit 320 is set up for continuous wave (CW) operation, and the current is set up for the middle of the desired YTO 100 band of oscillations. The YTO 100 is turned on, and its output frequency is monitored on the spectrum analyzer 360. The YIG sphere 180 is alternatively heated and cooled by, for example, either turning the RF signal through the coupling lines 122 off and on, or by turning on and off the infrared or similar focused heat source 400 in the proximity of the YIG sphere 180. The heating and cooling makes the YTO 100 output frequency drift. The control computer 310 commands the motor controller 380 operate the motor 390 to cause rotation of the rotateable plate 190 in an incremental fashion (e.g., between about 1° and 10° degrees with each increment), pausing between each increment. At each increment, the control computer 310 tests the YTO 100 output frequency drift as the YIG sphere 100 is heated and cooled. When the drift is zero, the YIG sphere 100 is on a thermally compensated axis. It should be appreciated that the same procedure may also be used to achieve alignment of some different desirable axis such as, for example, a YIG sphere 180 orientation where the drift compensates for changes in the magnetic field due to pole gap changes with temperature.

Once a thermally compensated axis is identified, the control computer 310 commands the main coil sweep unit 320 to sweep the desired frequency in slow steps. The spectrum analyzer 360 output is scanned for spurious outputs, frequency jumps, and phase noise at selected frequencies. The linearity of tuning is also checked by measuring and plotting the drive coil current supplied by the main coil sweep unit 320 versus the output frequency of the YTO 100. Then the control computer 310 commands main coil sweep 320 to sweep at a faster rate, and monitors the network analyzer 340. The YTO 100 output power flatness and continuity of power output versus frequency are checked. If any of these fail, a decision is made as to whether the failure is related to the active device 130 or the YIG sphere 180. If the decision is that it is YIG sphere 180 related, then the motor controller 380 is commanded to move the YIG sphere 180 to the next thermally compensated axis. The process is repeated until all specifications are met. At this point, the YIG sphere 180 is locked in position by means of epoxy and a curing process. A sphere is rejected if under no conditions can the oscillator meet phase noise specifications or exhibits frequency discontinuity, typically a temperature compensated axis. The probability of rejection of a sphere is approximately 2% or less. The particular phase noise specifications and frequency discontinuities are defined by the particular application. (PAUL, IS THIS ENOUGH OF A DEFINITION?)

Multi-Pole YTO Coupling Structure

Figure 10A:
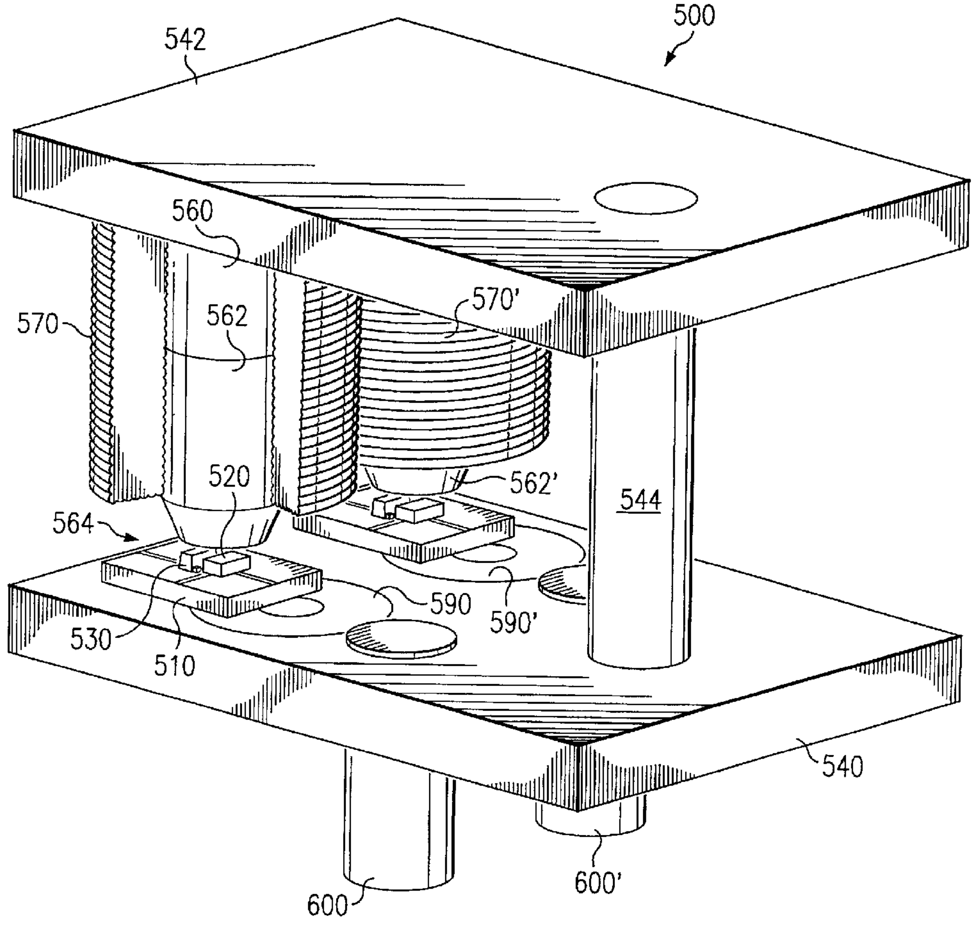
FIG. 10A is a perspective view of one embodiment of a multi-pole YTO coupling structure in accordance with the present invention.
Figure 10B:
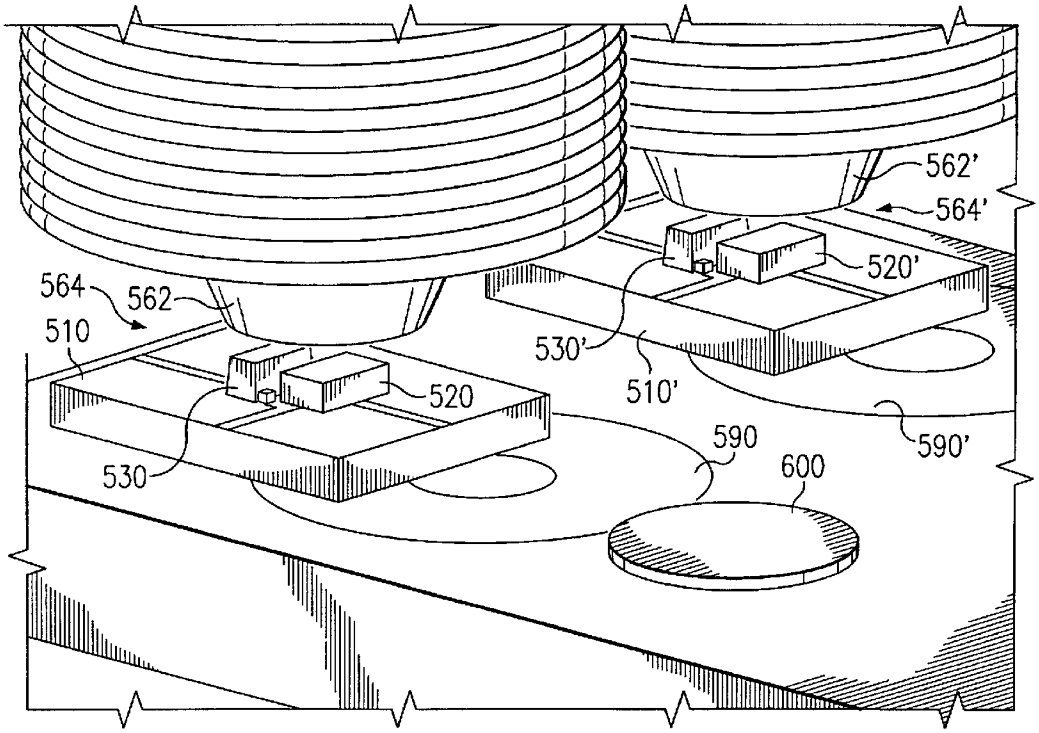
FIG. 10B is an enlarged perspective view of the multi-pole YTO coupling structure of FIG. 10A.

Referring now to FIGS. 10A–B, there are shown perspective and enlarged perspective views, respectively, of one embodiment of a multi-pole YTO coupling structure 500 in accordance with the present invention. The multi-pole YTO coupling structure 500 is capable of outputting oscillatory signals at different frequencies, and, thus, is particularly well suited for use as the local oscillator in a FDMA microwave transceiver upconverter/downconverter such as illustrated in FIG. 1.

The multi-pole YTO coupling structure 500 includes two circuit substrates 510, 510' which may, for example, includes microstrip substrates or stripline substrates including an electrically non-conductive material. Coupling substrates 520, 520' and packaged transistors 530, 530' are disposed on upper surfaces of each circuit substrate 510, 510'. Each group of a circuit substrate, coupling substrate and packaged transistor 510, 520, 530 and 510', 520', 530' are positioned between a lower ferromagnetic plate 540 and an upper ferromagnetic plate 542. The upper and lower ferromagnetic plates are connected near first ends thereof by a ferromagnetic connecting member 544.

The multi-pole YTO coupling structure 500 also includes a pair of permanent magnet/electromagnetic coil combinations. Each permanent magnet/electromagnetic coil combination includes a permanent magnet 560, 560' and a pole tip 562, 562'. The permanent magnets 560, 560' are connected to the upper ferromagnetic plate 542 proximate to a second side thereof opposite the first side with respective pole tips 562, 562' positioned above the respective coupling substrates 120, 120'. Each permanent magnet/electromagnetic coil combination also includes an electromagnetic coil 570, 570' coiled about their respective permanent magnets 560, 560' and pole tips 562, 562'. Each permanent magnet/electromagnetic coil combination supplies a DC magnetic field $H_{dc1}$, $H_{dc2}$ in its respective pole gap 564, 564' between the pole tips 562, 562' and the lower ferromagnetic plate 540, with the permanent magnets 560, 560' providing most of the DC magnetic fields $H_{dc1}$, $H_{dc2}$. It will be appreciated that the multi-pole YTO coupling structure 500 can be configured without the permanent magnets 560, 560', in which case the entirety of DC magnetic fields $H_{dc1}$, $H_{dc2}$ are supplied by current through the respective electromagnetic coils 570, 570'. The lower ferromagnetic plate 540, upper ferromagnetic plate 542 and connecting member 544 including a ferromagnetic material (e.g., pure iron or alloys such as Carpenter Hi-Perm 49, Carpenter Hi-Perm 80 or other nickel-iron alloys) and together cooperatively provide a magnetic field return path for the DC magnetic field $H_{dc}$.

Circuit substrate, coupling substrate and packaged transistor 510, 520, 530 are positioned in the pole gap 564 between pole tip 562 and the lower ferromagnetic plate 540. Likewise, circuit substrate, coupling substrate and packaged transistor 510', 520', 530' are positioned in the pole gap 564' between pole tip 562' and the lower ferromagnetic plate 540. Each pole gap 564, 564' may be of a nearly identical distance. Identical distance pole gaps 564, 564' permit different intensity DC magnetic fields $H_{dc}$ to be achieved in the two pole gaps 564, 564' by varying the current through the electromagnetic coils 570, 570'. Thus, by constructing the multi-pole YTO coupling structure 500 with identical pole gaps 564, 564', identical electromagnetic coils 570, 570', and other identical parts and construction, the tuning rate of both oscillators (i.e. δF/δI) will be the same. This allows the noise current of one of the transistors (e.g., transistor 530) to be used to common mode out the driver current related phase noise in the other transistor, thereby producing a much lower phase noise oscillator for critical communications applications.

Figure 10C:
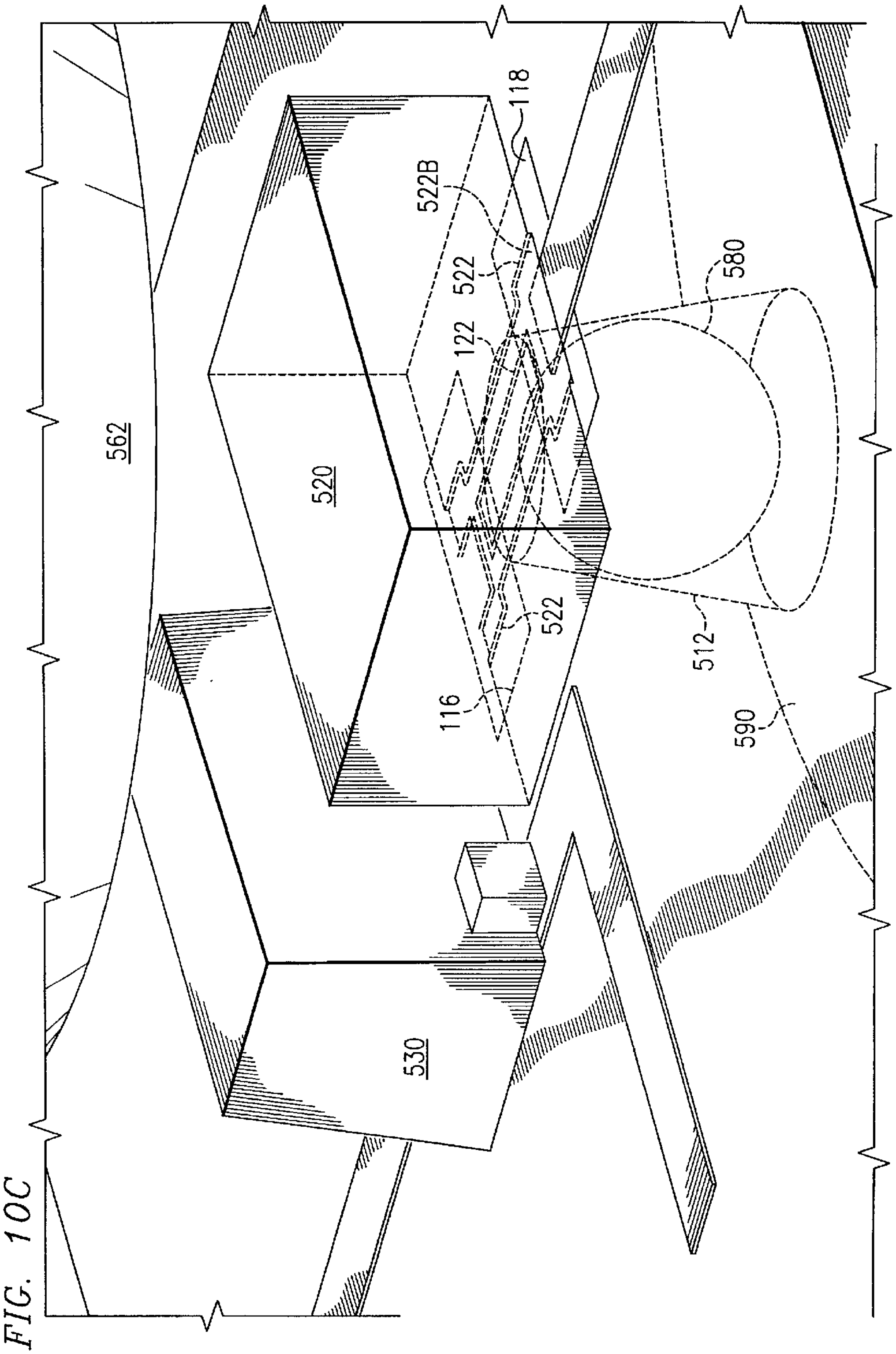
FIG. 10C is a further enlarged perspective view of the multi-pole YTO coupling structure of FIG. 10B.

Referring now to FIG. 10C there is shown a further enlarged perspective view showing the circuit substrate, coupling substrate and transistor 510, 520, 530 group in greater detail. The other circuit substrate, coupling substrate and transistor 510', 520', 530' group is configured in a similar fashion. The circuit substrate, coupling substrate and transistor groups 510, 520, 530 and 510', 520' 530' are each configured similar to the circuit substrate 110, coupling substrate 120 and transistor 130 of the single-pole YTO coupling structure 100 shown in FIGS. 5E–F. In this regard, there is a YIG sphere 580 disposed within a tapered aperture 512 in the circuit substrate 510. A pair of parallel coupling lines 522, which may be etched on the bottom surface of the coupling substrate 520, extend between first and second ends **522*a*, 522*b* thereof across a first opening of the aperture 512 on the upper surface of the circuit substrate 510. The transistor 530 may, for example, include surface mount bipolar or field effect transistors. In the case of a bipolar transistor, the transistors 530 may be arranged in a typical Colpitts oscillator configuration with the emitter terminal 530A thereof connected to the first ends 522*a* of the coupling lines 522**.

It will be appreciated that without the inclusion of the packaged transistors 530, 530', the multi-pole YTO coupling structure 500 includes a multi-pole ferrite crystal resonator coupling structure. It will further be appreciated, that with the addition of coupling lines extending across the lower openings of the apertures 512, 512' of the circuit substrates 510, 510', such a multi-pole resonator coupling structure may be configured as a multi-pole ferrite crystal filter coupling structure.

Having the YIG sphere 580 positioned within the aperture 512 in the circuit substrate 510, and placing of the coupling substrate 520 over the aperture 512 with the coupling lines extending across the first opening of the aperture 512, confines the RF magnetic field generated by current through the coupling lines 522 to a region very close to the circuit and coupling substrates 510, 520. Further, by grounding the edges of the circuit and coupling substrates 510, 520 around the perimeter edges thereof, stray RF electrical fields are confined within each substrate 510, 520.

One advantage of the multi-pole YTO structure 500 is that it is open, allowing for relatively easy construction and low cost because few machining or molding operations are required, and the need for costly magnetic material annealing to prevent saturation and hysterisis is minimized. If necessary, susceptibility of the open multi-pole YTO coupling structure 500 to external magnetic fields, including its orientation with respect to the earth's magnetic field, can be reduced or eliminated by enclosing the entire structure 500 within a magnetic shielding box or localized lid.

Figure 11A:
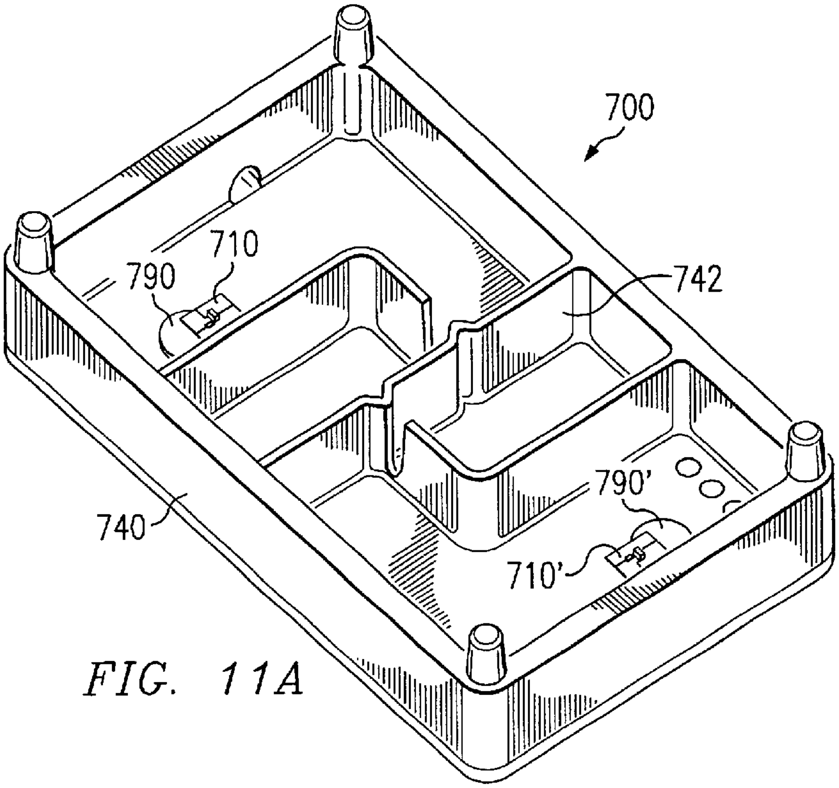
FIGS. 11A–C show top perspective, bottom perspective and enlarged perspective views of one embodiment of an enclosed multi-pole YTO coupling structure in accordance with the present invention.
Figure 11B:
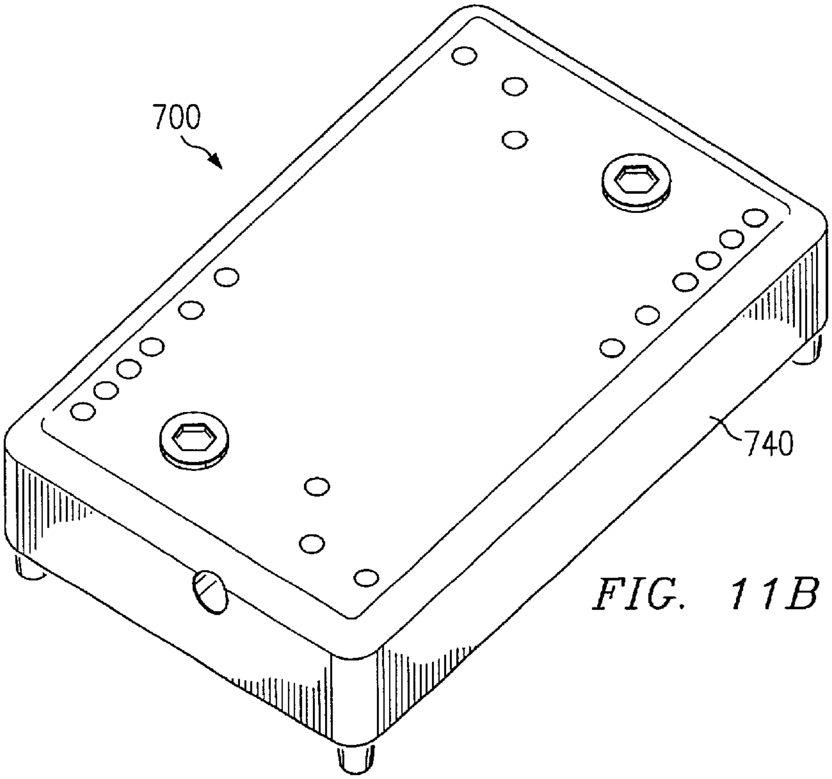
Figure 11C:
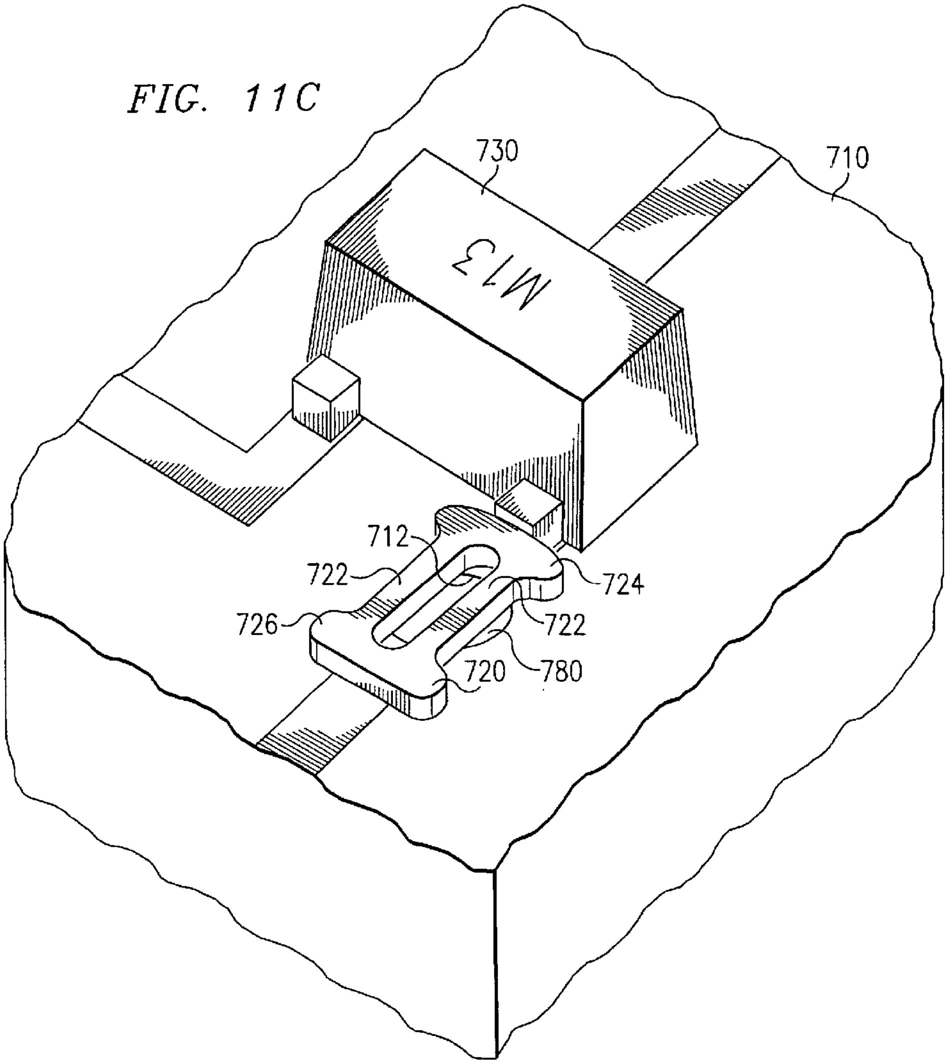

Referring now to FIGS. 11A–C, there are shown top perspective, bottom perspective and enlarged perspective views of one embodiment of an enclosed multi-pole YTO structure 700 in accordance with the present invention. The enclosed multi-pole YTO structure 700 includes two circuit substrates 710, 710'. As can be seen in the enlarged view of one of the circuit substrates 710 shown in FIG. 11C, each circuit substrate has a freestanding coupling member 720 and a packaged transistor 730 mounted on an upper surface thereof. The coupling member 720 includes a pair of parallel coupling lines 722 extending between first and second ends 724, 726 thereof across at least a portion of an aperture 712 in the circuit substrates 710, 710'. A YIG sphere 780 is disposed within the aperture 712 of each circuit substrate 710, 710'.

Each of the circuit substrates 710, 710' is disposed within a separate compartment of an enclosure 740. Each compartment of the enclosure 740 is divided from the other by a magnetic dam 742, providing for magnetic isolation between the YIG spheres 780. The enclosure also includes a removable lid (not shown) that is attachable to the enclosure 740. The circuit substrates 710, 710' are positioned such that each YIG sphere 780 is in contact with an upper surface of a rotateable plate 790, 790'. Each of the rotateable plates 790, 790' is coupleable with a motor in order to provide a rotational force to the YIG spheres 780 for aligning desired axes of the YIG spheres 780 with separate magnetic fields applicable with the apertures 712 of the circuit substrates 710, 710'. The separate magnetic fields may be supplied by separate permanent magnet/electromagnetic coil combinations (not shown) such as previously described.

While various embodiments of the present invention have been described in detail, further modifications and adaptations of the invention may occur to those skilled in the art. However, it is to be expressly understood that such modifications and adaptations are within the spirit and scope of the present invention.

What is claimed is:

1. A ferrite crystal resonator coupling structure comprising:

- a circuit substrate having a first side, a second side opposite the first side, and an aperture extending through the circuit substrate between a first opening of the aperture on the first side of the circuit substrate to a second opening of the aperture on the second side of the circuit substrate, wherein the aperture is configured to permit rotation of a ferrite crystal disposable at least partially therein; and
- a coupling member extending between a first end and a second end of the first opening of the aperture across at least a portion of the first opening of the aperture, such that an electric current is directable through the coupling member, wherein the aperture is configured to restrict movement of the ferrite crystal within the aperture toward the first opening of the aperture.

2. A ferrite crystal resonator coupling structure comprising:

- a circuit substrate having a first side, a second side opposite the first side, and an aperture extending through the circuit substrate between a first opening of the aperture on the first side of the circuit substrate to a second opening of the aperture on the second side of the circuit substrate, wherein the aperture is configured to permit rotation of a ferrite crystal disposable at least partially therein;
- a coupling member extending between a first end and a second end of the first opening of the aperture across at least a portion of the first opening of the aperture, such that an electric current is directable through the coupling member; and
- a coupling substrate on the first side of the circuit substrate, wherein (i) the coupling substrate includes a first side facing the first side of the circuit substrate and (ii) the coupling substrate is in registration with the coupling member.

3. The ferrite crystal resonator coupling structure of claim 2, wherein the ferrite crystal is rotateable about a plurality of axes whereby a desirable axis of the ferrite crystal is alignable in relation to a magnetic field within the aperture.

4. The ferrite crystal resonator coupling structure of claim 2, wherein the coupling member is etched into the coupling substrate.

5. The ferrite crystal resonator coupling structure of claim 2, wherein the coupling substrate is configured to restrict movement of the ferrite crystal within the aperture toward the first opening of the aperture.

6. The ferrite crystal resonator coupling structure of claim 2, wherein (i) the coupling substrate includes a hole in the first side thereof for receiving a portion of the ferrite crystal, and (ii) the hole is aligned with the first opening of the aperture and smaller in cross-sectional area than the first opening.

7. The ferrite crystal resonator coupling structure of claim 2, wherein the aperture is configured to restrict movement of the ferrite crystal within the aperture toward the first opening of the aperture.

8. The ferrite crystal resonator coupling structure of claim 2, further comprising:

- a structure for applying a force to effect rotation of the ferrite crystal about an axis of rotation of the ferrite crystal.

9. The ferrite crystal resonator coupling structure of claim 8, wherein the structure for applying a force to effect rotation of the ferrite crystal comprises:

- a rotateable element having a first surface that can come in contact with the ferrite crystal, wherein the rotateable element is rotateable to apply a frictional rolling force to the surface of the ferrite crystal.

10. The ferrite crystal resonator coupling structure of claim 9, further comprising:

a drive shaft for applying a rotational force to the rotateable element, wherein the drive shaft is coupleable with a motor.

11. The ferrite crystal resonator coupling structure of claim 9, wherein the first surface of the rotateable element is configured to initiate shifting of the ferrite crystal to a different axis of rotation of the ferrite crystal.

12. A multiple ferrite crystal resonator coupling structure comprising:

a first circuit substrate having a first side, a second side opposite the first side, and a first aperture extending through the first circuit substrate between a first opening of the first aperture on the first side of the first circuit substrate to a second opening of the first aperture on the second side of the first circuit substrate, wherein the first aperture is configured to permit rotation of a first ferrite crystal disposable at least partially therein about a plurality of axes such that a desirable axis of the first ferrite crystal is alignable in relation to a first magnetic field within the first aperture;

a second circuit substrate having a first side, a second side opposite the first side, and a second aperture extending through the second circuit substrate between a first opening of the second aperture on the first side of the second circuit substrate to a second opening of the second aperture on the second side of the second circuit substrate, wherein the second aperture is configured to permit rotation of a second ferrite crystal disposable at least partially therein about a plurality of axes such that a desirable axis of the second ferrite crystal is alignable in relation to a second magnetic field within the second aperture;

a first coupling member extending between a first end and a second end of the first opening of the aperture across at least a portion of the first opening of the first aperture, wherein a first electric current can be directed through the first coupling member; and a second coupling member extending between a first end and a second end thereof across at least a portion of the first opening of the second aperture, wherein a second electric current is can be directed through the second coupling member.

13. The multiple ferrite crystal resonator coupling structure of claim 12, further comprising an enclosure, the first and second circuit substrates being disposed within the enclosure.

14. The multiple ferrite crystal resonator coupling structure of claim 13, wherein the enclosure includes a magnetic dam disposed between the first and second circuit substrates for minimizing coupling between the first and second ferrite crystals.

15. A computer controlled automatic alignment system operable to effect rotation of a ferrite crystal within a ferrite crystal resonator coupling structure in a controlled incremental fashion until a desirable axis of the ferrite crystal is aligned in relation to a magnetic field, the automatic alignment system comprising:

a control computer;

a motor controller coupled to the control computer;

a motor coupled to the motor controller, the motor operable to generate a force for rotating the ferrite crystal;

a main coil sweep unit coupled to the control computer, the main coil sweep unit operable to supply a variable electrical current to the ferrite crystal resonator coupling structure;

output instrumentation coupled to the control computer, the output instrumentation adapted to measure characteristics of the output of the ferrite crystal resonator structure and to provide the measurements to the control computer; and a heat source (i) coupled to the control computer and (ii) operable to heat the ferrite crystal in the ferrite crystal resonator coupling structure when instructed to by the control computer.

16. The automatic alignment system of claim 15 wherein the output instrumentation comprises:

a scalar network analyzer coupled to the control computer, the scalar network analyzer adapted to interface with the ferrite crystal resonator coupling structure and communicate any information collected by the scalar network analyzer to the control computer.

17. The automatic alignment system of claim 15 wherein the output instrumentation comprises:

a frequency counter coupled to the control computer, the frequency counter adapted to interface with the ferrite crystal resonator coupling structure and communicate any information collected by the frequency counter to the control computer.

18. The automatic alignment system of claim 15 wherein the output instrumentation comprises:

a spectrum analyzer coupled to the control computer, the spectrum analyzer adapted to interface with the ferrite crystal resonator coupling structure and communicate any information collected by the spectrum analyzer to the control computer.

19. The automatic alignment system of claim 15 wherein the output instrumentation comprises:

a power meter coupled to the control computer, the power meter adapted to interface with the ferrite crystal resonator coupling structure and communicate any information collected by the power meter to the control computer.

20. A ferrite crystal resonator coupling structure comprising:

a circuit substrate having a first side, a second side opposite the first side, and an aperture extending through the circuit substrate between a first opening of the aperture on the first side of the circuit substrate to a second opening of the aperture on the second side of the circuit substrate, wherein the aperture is configured to permit rotation of a ferrite crystal disposable at least partially therein;

a coupling member extending between a first end and a second end of the first opening of the aperture across at least a portion of the first opening of the aperture, such that an electric current is directable through the coupling member; and a structure for applying a force to effect rotation of the ferrite crystal about an axis of rotation of the ferrite crystal, said structure comprising a rotateable element having a first surface that can come in contact with the ferrite crystal, wherein the rotateable element is rotateable to apply a frictional rolling force to the surface of the ferrite crystal.

* * * * *